(12) United States Patent
Zhang et al.

(10) Patent No.: US 8,676,120 B2
(45) Date of Patent: Mar. 18, 2014

(54) COUPLED SHORT-RANGE WIRELESS MOBILE TERMINAL AND RELAY

(75) Inventors: Yi Zhang, Beijing (CN); Ning Ge, Beijing (CN); Zhiwei Meng, Beijing (CN); Guangnuan Liu, Beijing (CN)

(73) Assignee: Shenzhen Cloud Communication Epoch Sci-Tech Ltd, Shenzhen (CN)

( * ) Notice: Subject to any disclaimer, the term of this patent is extended or adjusted under 35 U.S.C. 154(b) by 358 days.

(21) Appl. No.: 13/110,091

(22) Filed: May 18, 2011

(65) Prior Publication Data

US 2012/0276912 A1    Nov. 1, 2012

(30) Foreign Application Priority Data

Apr. 29, 2011    (CN) .......................... 2011 1 0110286

(51) Int. Cl.
*H04B 7/00*    (2006.01)
(52) U.S. Cl.
USPC ............ 455/41.2; 455/88; 455/445; 455/466; 455/426.2; 455/422.1; 455/426.1; 455/435.1; 455/11.1; 455/13.1; 375/272; 370/350; 370/315; 370/252
(58) Field of Classification Search
USPC .............. 455/41.2, 88, 445, 466, 426.2, 423, 455/422.1, 426.1, 435.1, 11.1, 13.1; 375/272; 370/350, 315, 252
See application file for complete search history.

(56) References Cited

U.S. PATENT DOCUMENTS

| | | | | |
|---|---|---|---|---|
| 5,974,092 | A * | 10/1999 | Roos et al. .................... | 375/272 |
| 2004/0203382 | A1* | 10/2004 | Park ............................. | 455/41.2 |
| 2008/0102843 | A1* | 5/2008 | Todd et al. .................... | 455/445 |
| 2009/0003307 | A1* | 1/2009 | Yang et al. .................... | 370/350 |
| 2010/0083127 | A1* | 4/2010 | Rofougaran .................. | 715/740 |
| 2010/0234051 | A1* | 9/2010 | Holden et al. ................ | 455/466 |
| 2011/0021189 | A1* | 1/2011 | Tischer et al. ............. | 455/426.2 |
| 2011/0205955 | A1* | 8/2011 | Xu et al. ....................... | 370/315 |
| 2012/0165006 | A1* | 6/2012 | Ge et al. ........................ | 455/423 |
| 2012/0165008 | A1* | 6/2012 | Ge et al. ..................... | 455/426.1 |
| 2012/0165011 | A1* | 6/2012 | Ge et al. ..................... | 455/435.1 |
| 2012/0165026 | A1* | 6/2012 | Ge et al. ........................ | 455/445 |
| 2012/0176927 | A1* | 7/2012 | Takano ......................... | 370/252 |
| 2012/0184207 | A1* | 7/2012 | Gaines et al. ................ | 455/11.1 |

\* cited by examiner

*Primary Examiner* — April G Gonzales
(74) *Attorney, Agent, or Firm* — Anova Law Group, PLLC

(57) ABSTRACT

A wireless communication system is provided. The wireless communication system includes a wireless relay and a mobile terminal. The wireless relay is coupled to a phone network. The mobile terminal is physically coupled to the wireless relay to make a voice communication with the phone network via the wireless relay. Further, the mobile terminal and the wireless relay exchange control data and voice data corresponding to the voice communication over a short-range wireless link based on one of a transparent mode and a translation mode. A signaling connection is established on an asynchronous connection-oriented logical (ACL) transport channel between the mobile terminal and the wireless relay for exchanging the control data, and a voice connection is established on a synchronous connection oriented (SCO) channel between the mobile terminal and the wireless relay for exchanging the voice data.

23 Claims, 18 Drawing Sheets

| Sub-Type | Request Header | Usage |
|---|---|---|
| SIM Card | ATPQ_SIM | SIM card visit/modify, including phone book, SIM card short message, PIN, PUK, and other SIM tool kit (STK) operations |
| Call | ATPQ_CAL | Calls and call-related configurations |
| SMS | ATPQ_SMS | Short message service (SMS) and USSD reception and transmission and related configurations |
| Registration | ATPQ_REG | Communication network registration, search, setup, and device information |
| Others | ATPQ_MIS | Miscellaneous commands |
| Extension | ATPQ_VEN | Vendor defined |

FIG. 4

| Sub-Type | Response Header | Usage |
|---|---|---|
| General Response | ATPR_GEN | General response commands |
| SIM Card | ATPR_SIM | Response to ATPQ_SIM |
| Call | ATPR_CAL | Response to ATPQ_CAL |
| SMS | ATPR_SMS | Response to ATPQ_SMS |
| Registration | ATPR_REG | Response to ATPQ_REG |
| Others | ATPR_MIS | Response to ATPQ_MIS |
| Extension | ATPR_VEN | Response to ATPQ_VEN |

FIG. 5

| Sub-Type | Response Header | Usage |
|---|---|---|
| SIM Card | ATPU_SIM | SIM card status change and other STK related changes |
| Call | ATPU_CAL | Dialed, activated, and incoming calls, etc. |
| SMS | ATPU_SMS | Incoming short message |
| Registration | ATPU_REG | Mobile and network update |
| Others | ATPU_MIS | Micellaneous |
| Extension | ATPU_VEN | Vendor defined |

FIG. 6

Mobile Terminal 120    Voice relay 110

Mobile terminal 120 and voice relay 110

COUPLED SHORT-RANGE WIRELESS MOBILE TERMINAL AND RELAY

CROSS-REFERENCES TO RELATED APPLICATIONS

This application claims the priority of Chinese patent application number 201110110286.5, filed on Apr. 29, 2011, the entire contents of which are incorporated herein by reference.

FIELD OF THE INVENTION

The present invention generally relates to wireless communication technologies and, more particularly, to the methods and systems relaying communication using short-range wireless techniques.

BACKGROUND

The quality for indoor cellular communication is often poor due to signal attenuation by building walls and windows. Common solutions include increasing the outdoor base station's output power in the downlink direction, increasing the number of base stations, or increasing output power of mobile terminals. However, these methods increase radiation and cause electromagnetic pollution.

Other solutions such as Femtocell have also been developed. A Femtocell is a small cellular base station typically designed for use in a home or small business. The Femtocell communicates with mobile terminals over the same cellular bandwidth on one side and communicates to operator's networks through land-line broadband IP connections on the other side. However, Femtocell base stations are often complex, difficult to manage, and expensive, and are also often not portable. Further, it may be impractical or inflexible to integrate a Femtocell base station with the mobile terminal, and it is difficult to carry both a Femtocell base station and a mobile terminal for desired communication quality.

The disclosed methods and systems are directed to solve one or more problems set forth above and other problems.

BRIEF SUMMARY OF THE DISCLOSURE

One aspect of the present disclosure includes a wireless communication system. The wireless communication system includes a wireless relay and a mobile terminal. The wireless relay is coupled to a phone network. The mobile terminal is physically coupled to the wireless relay to make a voice communication with the phone network via the wireless relay. Further, the mobile terminal and the wireless relay exchange control data and voice data corresponding to the voice communication over a short-range wireless link based on one of a transparent mode and a translation mode. A signaling connection is established on an asynchronous connection-oriented logical (ACL) transport channel between the mobile terminal and the wireless relay for exchanging the control data, and a voice connection is established on a synchronous connection oriented (SCO) channel between the mobile terminal and the wireless relay for exchanging the voice data.

Another aspect of the present disclosure includes a wireless relay. The wireless relay includes a phone module and a wireless module. The phone module is configured to couple the wireless relay with a phone network. The wireless module is coupled to the phone module and is configured to wirelessly connect to a mobile terminal such that the mobile terminal makes a voice communication with the phone network via the wireless relay. Further, the mobile terminal and the wireless relay exchange control data and voice data corresponding to the voice communication over a short-range wireless link based on one of a transparent mode and a translation mode. The wireless relay is also configured as a casing for the mobile terminal and to be physically coupled to the mobile terminal through a connector interface including at least a charging interface.

Other aspects of the present disclosure can be understood by those skilled in the art in light of the description, the claims, and the drawings of the present disclosure.

BRIEF DESCRIPTION OF THE DRAWINGS

FIG. 4 illustrates exemplary ATP commands for ATP requests consistent with the disclosed embodiments;

FIG. 5 illustrates exemplary ATP commands for normal ATP responses consistent with the disclosed embodiments;

FIG. 6 illustrates exemplary ATP commands for unsolicited ATP responses consistent with the disclosed embodiments;

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1A:
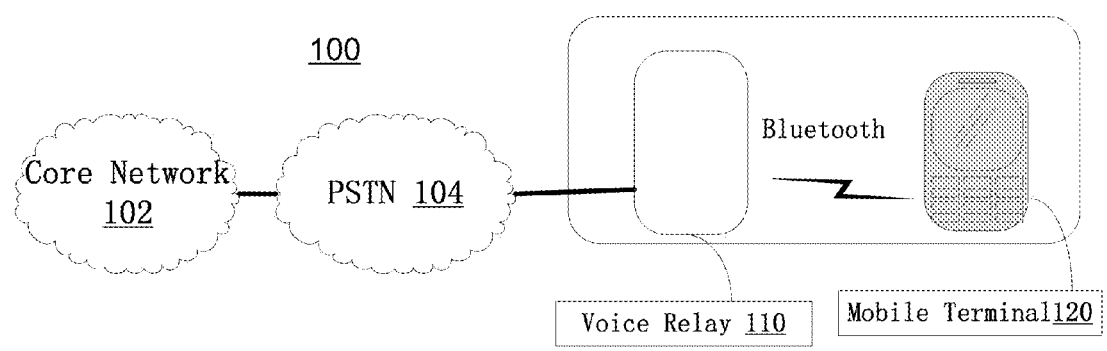
FIG. 1A illustrates an exemplary communication environment consistent with the disclosed embodiments.

FIG. 1A shows an exemplary communication environment 100 incorporating certain aspects of the disclosed embodiments. As shown in FIG. 1A, communication environment 100 includes a core network 102, a public switched telephone network (PSTN) 104, a voice relay 110, and a mobile terminal 120. The type and number of components are shown for illustrative purposes. Any number of listed components may be used and other components may also be included.

Core network 102 may be managed by a network operator to administer network operations for both data and voice. Core network 102 may interface with multiple access networks to connect a call request or data request from one access network to another access network, and to receive uplink signals from access networks and to generate downlink signals to access networks.

PSTN 104 may include any appropriate telephone network providing landline-based communication or any appropriate fixed telephone network. PSTN 104 may receive uplink signals from voice relay 110 and mobile terminal 120 and forward the uplink signals to core network 102 and a corresponding access network. PSTN 104 may also receive downlink signals for voice relay 110 and mobile terminal 120 from core network 102 and forward the downlink signals to voice relay 110 and mobile terminal 120.

Voice relay 110 and mobile terminal 120 may communicate with each other over a short-range wireless link, for example, a Bluetooth communication link. Other wireless link may also be used. A short-range wireless link may refer to a communication link based on one or more wireless technologies used in a place close to a user, such as a home, a small office, or a building. For example, a Bluetooth wireless may be used in a 10 m or 100 m range. Short-range wireless links may also include wireless links based on a short-range suitable wireless spectrum, such as based on the industrial, scientific, and medical (ISM) radio bands. Voice relay 110 performs certain receiving and sending functions for mobile terminal 120 such that radiation from antennas of mobile terminal 120 may be substantially reduced. Because voice relay 110 connects mobile terminal 120 over a wireless link, voice relay 110 may also be considered as a wireless relay. A wireless relay such as voice relay 110 may include not only voice communication but also other types of communications, such as text, video, or multimedia. Further, voice relay 110 and mobile terminal 120 may be treated as a wireless communication system.

Figure 1B:
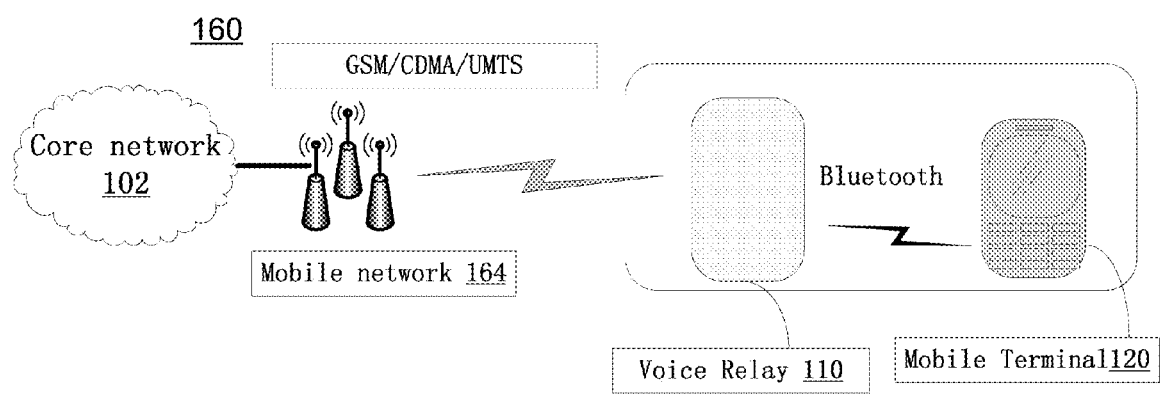
FIG. 1B illustrates another exemplary communication environment consistent with the disclosed embodiments.

FIG. 1B shows an exemplary communication environment 160 similar to the exemplary communication environment 100 illustrated in FIG. 1A. As shown in FIG. 1B, core network 102 is connected to a mobile network 164, instead of the PSTN network 104 in FIG. 1A. Further, communication environment 160 includes core network 102, a mobile network 164, voice relay 110, and mobile terminal 120. Mobile network 164 may be any mobile telecommunication networks. For example, the mobile network 164 may be global system for mobile communication (GSM), code division multiple access (CDMA) or universal mobile telecommunications system (UMTS). Mobile network 164 may receive uplink signals from voice relay 110 and mobile terminal 120 and forward the uplink signals to core network 102 and a corresponding access network. Mobile network 164 may also receive downlink signals for voice relay 110 and mobile terminal 120 from core network 102 and forward the downlink signals to voice relay 110 and mobile terminal 120.

Figure 2:
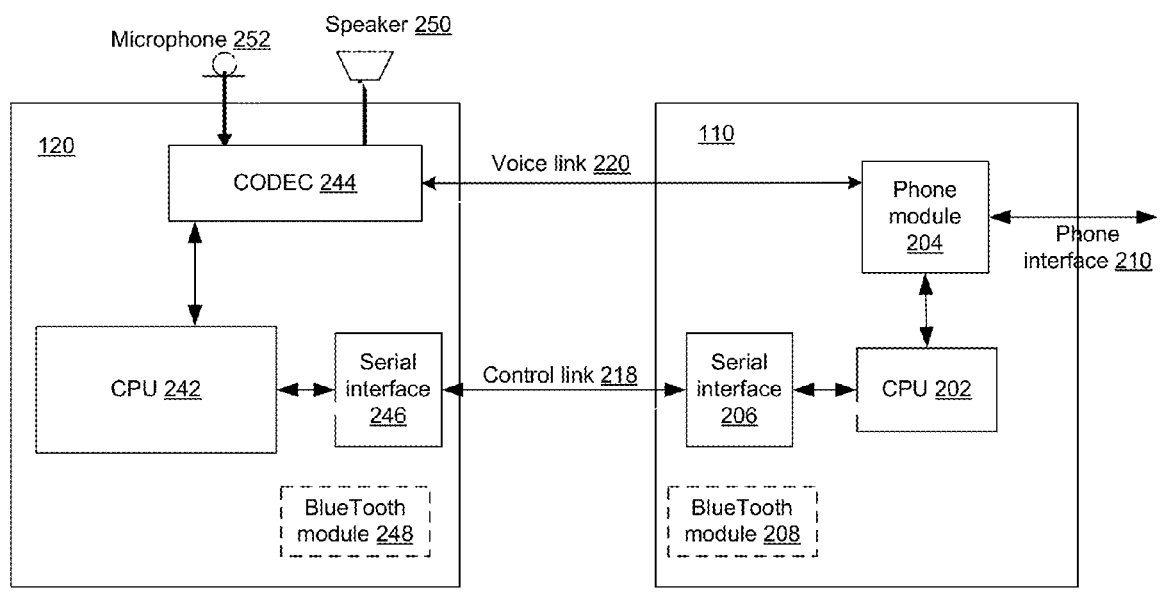
FIG. 2 illustrates a block diagram of an exemplary arrangement of a voice relay and a mobile terminal consistent with the disclosed embodiments.

FIG. 2 illustrates a block diagram of an exemplary arrangement of voice relay 110 and mobile terminal 120 consistent with the disclosed embodiments. The modules shown in FIG. 2 are for illustrative purposes, and not intended to be limiting. As show in FIG. 2, voice relay 110 may include a CPU 202, a phone module 204, a serial interface 206, a Bluetooth module 208, and a phone interface 210.

CPU 202 may include any appropriate type of graphic processing unit (GPU), general-purpose microprocessor, digital signal processor (DSP) or microcontroller, and application specific integrated circuit (ASIC), etc. CPU 202 may also include processing unit for providing particular functions depending on particular applications. Further, CPU 202 may execute sequences of computer program instructions to perform various processes associated with voice relay 110. The computer program instructions may be loaded into various memory modules from a storage memory or device (not shown).

Phone module 204 may include any appropriate components configured to communicate with a phone network, such as PSTN network 104 or mobile network 164. Phone module 204 may communicate with PSTN network 104 or mobile network 164 through phone interface 210, receiving communication signals from PSTN network 104 or mobile network 164 and sending communication signals to PSTN network 104 or mobile network 164. When phone module 204 is configured to communicate with PSTN network 104, phone interface 210 may be a PSTN interface. On the other hand, when phone module 204 is configured to communicate with a mobile network 164, phone interface 210 may be a wireless interface.

Further phone module 204 may include components capable of communicating only with PSTN network 104 or only with mobile network 164, or phone module 204 may include components capable of communicating with both PSTN network 104 and mobile network 164. When phone module 204 includes components capable of communicating with both PSTN network 104 and mobile network 164, phone interface 210 may include a PSTN network interface and a cellular phone interface. And a user may have the option to choose one of them to work with.

Bluetooth module 208 is provided to communicate with a plurality of mobile terminals over a Bluetooth wireless link. For example, Bluetooth module 208 may receive voice and control data from mobile terminal 120 via an RF interface (not shown) according to Bluetooth communication standards, and may translate the received voice and control data into data signals supported by phone module 204 and CPU 202. Similarly, Bluetooth module 208 may receive voice and control data from phone module 204 and CPU 202 and send the received voice and control data to mobile terminal 120. In addition, voice relay 110 may be portable, especially when communicating with mobile network 164. For example, voice relay 110 may be configured in a way such that voice relay 110 may be placed in different locations without removing cables or external links. Or voice relay 110 may be carried by a user during normal operation. Serial interface 206 may be provided as a communication channel for data exchange (e.g., control data) between voice relay 110 and mobile terminal 120. Serial interface 206 may include logical interfaces of a single or multiple physical serial interfaces, such as UART, SPI, or USB interface.

Further, mobile terminal 120 may include a CPU 242, an audio coder and decoder (CODEC) 244, a Bluetooth module 248, and a serial interface 246. A microphone 252 and a speaker 250 are coupled to audio CODEC 244, and audio CODEC 244 is coupled to CPU 242 and/or Bluetooth module 248 to provide audio channels via various types of interfaces, such as analog, PCM, I2S (inter-IC sound), and PDM. CPU 242 may be similar to CPU 202 in voice relay 110 and configured to provide control functions to mobile terminal 120; Bluetooth module 248 may be similar to Bluetooth module 208 in voice relay 110; and serial interface 246 may be similar to serial interface 206 in voice relay 110. Detailed descriptions are omitted for simplicity purposes. In addition, microphone 252 may include one or more appropriate type of microphones and may receive voice signals from a user of mobile terminal 120 and may send the voice signals to audio CODEC 244 for processing. Similarly, audio CODEC 244 may convert received voice data into voice signals for speaker 250. Speaker 250 may include one or more appropriate type of speakers and may receive voice signals from audio CODEC 244 to generate audio.

During operation, voice relay 110 may be coupled with mobile terminal 120 through a control link 218 for exchanging control data and a voice link 220 for exchanging voice data. Control link 218 and voice link 220 may include any appropriate logical and/or physical communication channels, and may be based on various physical communication media. For example, control link 218 and voice link 220 may be established over the Bluetooth wireless link or any other short-range wireless communication link. Further, control link 218 and voice link 220 may also be established over a wired connection, such as a cable or a bus extension. Any appropriate connection methods may be used.

Figure 3:
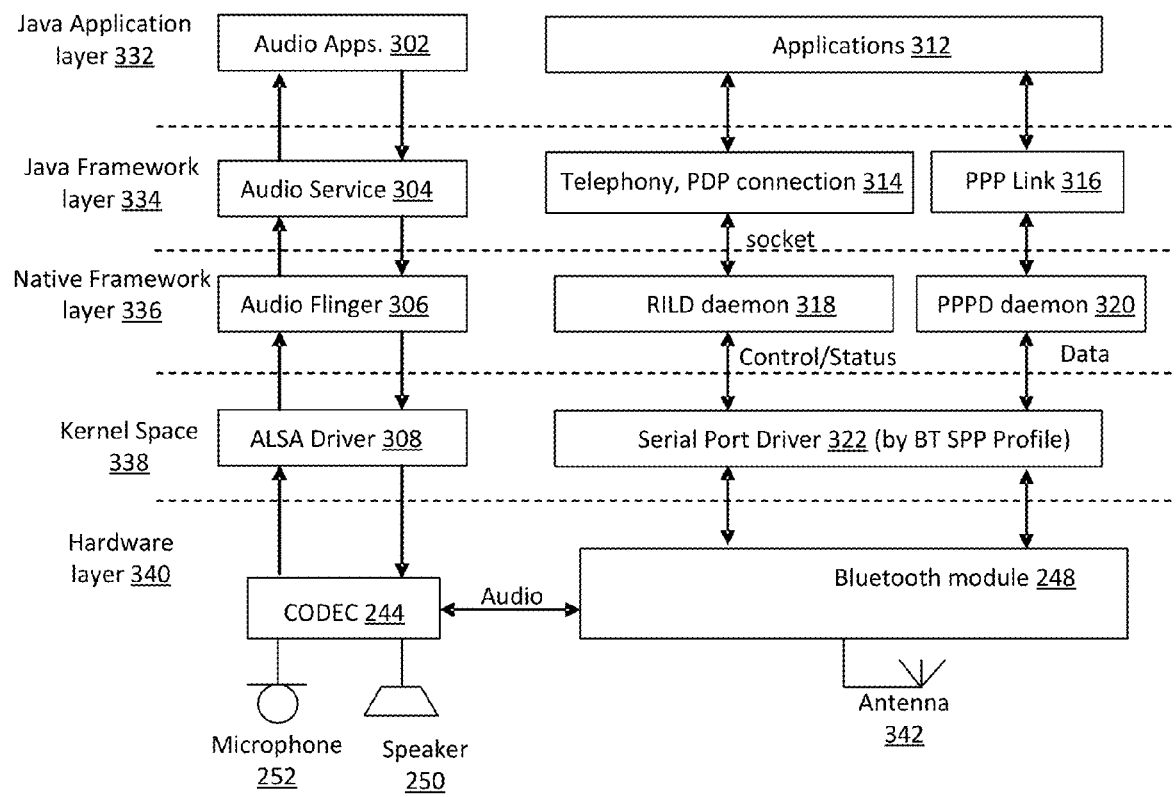
FIG. 3 illustrates an exemplary framework diagram of a mobile terminal consistent with the disclosed embodiments.

FIG. 3 illustrates an exemplary framework diagram of mobile terminal 120 configured for operating with voice relay 110. As shown in FIG. 3, mobile terminal 120 may be implemented via hardware and software that separated into different functional layers. For example, the hardware and software of mobile terminal 120 may include a Java application layer 332, a Java framework layer 334, a native framework layer 336, a kernel space 338, and a hardware layer 340.

Hardware layer 340 may include actual hardware devices with certain functionalities for mobile terminal 120, such as CODEC 244, microphone 252, speaker 250, Bluetooth module 248, and an antenna 342, etc. Other devices may also be included. Further, Bluetooth module 248 may be coupled to CODEC 244 via certain audio interface directly or indirectly.

Kernel space 338 may include any appropriate operating system (OS) components, such as advanced Linux sound architecture (ALSA) driver, serial port driver 332, etc. Any OS may be used, such as Linux, Android, Windows, etc. Further, native framework layer 336 may include any appropriate OS specific software framework running on the OS, such as an audio flinger 306, and a radio interface layer daemon (RILD) 318, a point-to-point protocol (PPP) daemon 320.

Java framework layer 334 may include any appropriate Java software environment for mobile terminal 120 running over native framework layer 336, such as audio service 304, telephony and packet data protocol (PDP) 314, PPP link 316. Further, Java application layer 332 may include any appropriate applications for mobile terminal 120, such as audio applications 302, and applications 312 providing telephonic and other communication related functionalities.

Further, different layers of the framework of mobile terminal 120 may collaborate to complete one or more particular tasks. For example, audio applications 302 may be provided to a user of mobile terminal 120 with certain audio functionalities, such as audio playback or voice communication. Audio applications 302 may provide those audio functionalities through audio service 304, which in turn uses audio flinger 306, ALSA driver 308, and CODEC 244 to carry out those functionalities.

Also for example, applications 312 may be provided to the user for certain voice and/or data functionalities, such as making phone call or text messaging. Applications 312 may provide those functionalities using telephony and PDP connection 314, PPP link 316, RILD daemon 318, and PPPD Daemon 320, serial port driver 322, Bluetooth module 248, and antenna 342. Telephony and PDP connection 314 and RILD daemon 318 may be used for voice applications, and PPP link 316 and PPPD Daemon 320 may be used for data applications. Applications 312 may also use audio applications 302 and other related layers.

More particularly, mobile terminal 120 may use certain Bluetooth profiles to provide services. For example, mobile terminal 120 may use a serial port profile (SPP) to provide various services, such as a data service. The SPP services may create one or more virtual serial devices connected to voice relay 110 to establish data communication. For another example, mobile terminal 120 may also use a headset profile (HSP) to provide a variety of services, such as voice services (not shown).

For example, RILD 318 may receive control data from other layers and may use the one or more virtual serial devices to forward the control data to voice relay 110. RILD 318 may use standard modem commands, such as AT commands, to set up and/or perform voice communication via voice relay 110. Standard modem commands may include any appropriate commonly used command sets or standardized modem command sets. In certain embodiments, RILD 318 may receive various requests, such as requests for a telephone call, a text message, or a PDP connection, from an upper layer. After receiving such request, RILD 318 may translate the request into an AT command recognizable by other communication components, such as phone module 204. At the same time, RILD 318 may establish a synchronous connection oriented (SCO) channel, an extended synchronous connection oriented (eSCO) channel, or other channels to send voice signals to voice relay 110. PPPD 320 may perform similar functions to RILD 318 to provide control and/or data services.

In a reverse direction, voice relay 110 may receive control data corresponding to voice data from the SCO channel, eSCO channel, or other channels, and may forward the control data to mobile terminal 120 through the one or more virtual serial devices. RILD 318 may receive the forwarded control data from the one or more virtual serial devices, and may further send the received control data to corresponding layers or applications. In certain embodiments, RILD 318 may receive AT commands corresponding to the telephone call, text message, or PDP connection. At the same time, RILD 318 may establish the SCO channel, eSCO channel, or other channels to receive voice data from voice relay 110. PPPD 320 may perform similar functions to RILD 318 to provide control and/or data services.

RILD 318 may use one or more virtual serial devices connected to voice relay 110 to establish data communication. That is, RILD 318 may receive control data from other layers and may use the one or more virtual serial devices to forward the control data to voice relay 110. Further, RILD 318 may use a customized or self-defined interface language between mobile terminal 120 and voice relay 110 called abstract telephony protocol (ATP) to carry out the communication. Because the ATP is only shared between mobile terminal 120 and voice relay 110 to set up and/or perform voice communication, other systems (e.g., core network 102) involved in the voice communication do not understand ATP commands and may need translation. Phone module 204 in voice relay 110 may also be unable to understand ATP commands and may also need translation.

The ATP may include two categories of commands. The first category includes request commands, i.e., various requests from mobile terminal 120, such as a request for dialing or for a PDP connection. The second category includes response commands, i.e., various responses from voice relay 110 in reply to the various requests from mobile terminal 120 and requests from the network side. The network side may refer to devices or software components from PSTN network 104, mobile network 164 or core network 102. Further, the various responses from voice relay 110 in reply to the various requests from mobile terminal 120 may be called normal response (NR); and the requests from the network side may be called unsolicited response (UR). Other categories may also be used.

An ATP command may contain a series of ASCII characters starting with, for example, "ATP." FIG. 4 illustrates exemplary ATP commands for ATP requests (APTQ). As shown in FIG. 4, ATPQ commands include various sub-types of commands, such as SIM card commands, Call commands, SMS commands, Registration commands, other commands, and Extension commands. Other types of commands may also be included.

Each sub-type commands may include a series of concrete ATP commands. For example, an ATPQ_CAL sub-type may include ATP commands such as call initiating request (ATPQ_ CAL_DIAL), hang-up request (ATPQ_CAL_HANG), call waiting request (ATPQ_CAL_WAIT), call holding request (ATPQ_CAL_SWITH_WAIT), call forwarding request (ATPQ_CAL_FORWARD), call muting request (ATPQ_CAL_ MUTE), and call history request (ATPQ_CAL_LAST). Other commands may also be included.

Further, an ATP command may also contain one or more parameters, separated with a separator (e.g., "#") from the command part. For example, a call initiating request may be ATPQ_CAL_DIAL#65478898. Other formats may also be used.

FIG. 5 illustrates exemplary ATP commands for normal ATP responses (APTR). As shown in FIG. 5, ATPR commands also include various sub-types of responses, such as general responses, SIM card responses, Call responses, SMS responses, Registration responses, other responses, and Extension responses. A general response is used to return an execution status corresponding to a request in general. For example, an ATPR_GEN_OK may indicate a request is executed successfully, an ATPR_GEN_FAIL may indicate a request is failed to execute, and may follow certain error codes and error information, such as ATPR_GEN_FAIL#E10223#NO_SIM_CARD; and an ATPR_GEN_ERR may indicate the request could not be interpreted or the request may contain errors. Further, other ATPR sub-types of commands may reply to particular requests and may also contain detailed parameters in response to the particular requests.

FIG. 6 illustrates exemplary ATP commands for unsolicited ATP responses (APTU). As shown in FIG. 6, ATPU commands also include various sub-types of responses, such as SIM card responses, Call responses, SMS responses, Registration responses, other responses, and Extension responses, similar to FIG. 4. However, those responses are from the network side and are not in reply to any requests from mobile terminal 120.

Figure 7:
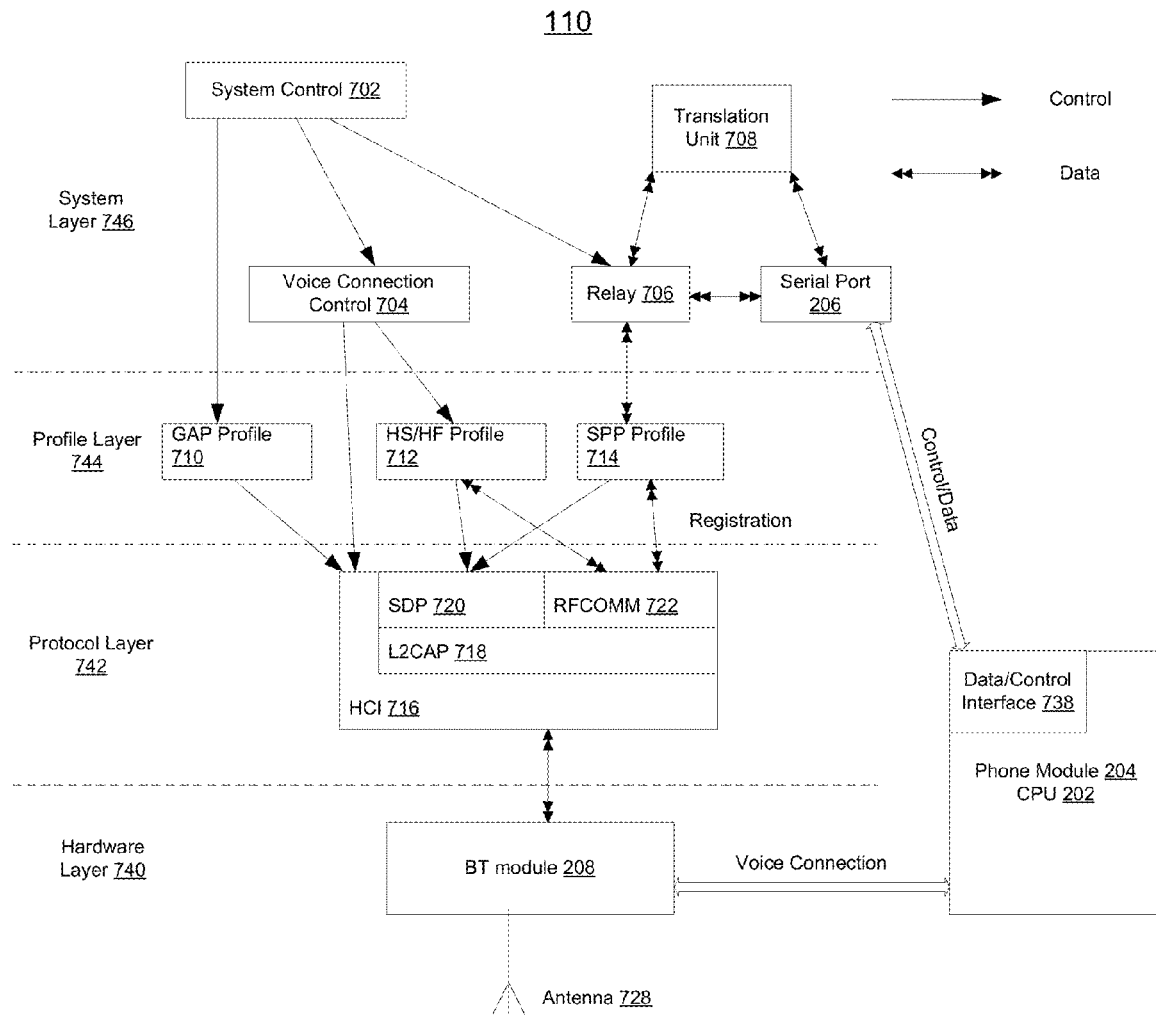
FIG. 7 illustrates an exemplary framework diagram of a voice relay consistent with the disclosed embodiments.

FIG. 7 illustrates an exemplary framework diagram of voice relay 110 corresponding to mobile terminal 120. As shown in FIG. 7, voice relay 110 may also be implemented via hardware and software that separated into different functional layers. For example, the hardware and software of voice relay 110 may include a hardware layer 740, a protocol layer 742, a profile layer 744, and a system layer 746. These layers are listed for illustrative purposes only, other layers, such as various OS layers and other framework and application layers, may also be included.

Hardware layer 740 may include actual hardware devices with certain functionalities for voice relay 110, such as Bluetooth module 208, an antenna unit 728, phone module 204, and CPU 202, etc. Other devices may also be included. Further, Bluetooth module 208 may be in communication with mobile terminal 120, and may also be coupled to phone module 204 to establish a voice connection for forwarding certain voice data from mobile terminal 120 to core network 102 via phone module 204, which may include one or more wired or wireless communication links.

Protocol layer 742 may include any appropriate protocol components, such as a host control interface (HCI) protocol 716, a logical link control & adaptation protocol (L2CAP) 718, a service discovery protocol (SDP) 720, and a radio frequency communications (RFCOMM) protocol 722, etc. Other protocols may also be used. Further, profile layer 744 may include various Bluetooth service profiles provided by voice relay 110, such as a generic access profile (GAP) 710, a headset profile (HSP) and hands-free profile (HFP) or HS/HF profile 712, a serial port profile (SPP) 714, etc. Certain registration processes may be performed between the various profiles and protocols.

Further, system layer 746 may include any appropriate components for providing system-level services to other components or voice relay 110, such as a system control unit 702, a voice connection control unit 704, and a relay 706, etc. System control unit 702 may control other components such as GAP profile 710, voice connection control unit 704, and relay 706 to enable system operation. Voice connection control unit 704 may control components related to voice connections of voice relay 110, and relay 706 may be coupled to serial port 206 to forward data received from Bluetooth module 208 to phone module 204, without further interpretation or translation. That is, relay 706 implements a transparent mode of voice relay 110 for forwarding received control/voice data without interpretation. Serial port 206 may include any appropriate serial port(s) and may be coupled to a data/control interface 738 of phone module 204 and/or CPU 202.

Optionally, as previously explained, when mobile terminal 120 uses ATP to set up communications, voice delay 110 may translate the ATP commands. Translation unit 708 may be coupled to relay 706 to receive ATP commands from mobile terminal 120 and may translate the ATP commands into other formats recognizable by phone module 204 or other devices, such as standard modem commands, from the network side. Translation unit 708 may also be coupled to serial port 206 to forward the translated commands to phone module 204 and/or CPU 202.

In the reverse direction, translation unit 708 may receive commands or responses from phone module 204 and may translate the received commands or responses into ATP commands and forward the translated ATP commands to mobile terminal 120 through relay 706. That is, voice relay 110 may operate in a translation mode.

Figure 8:
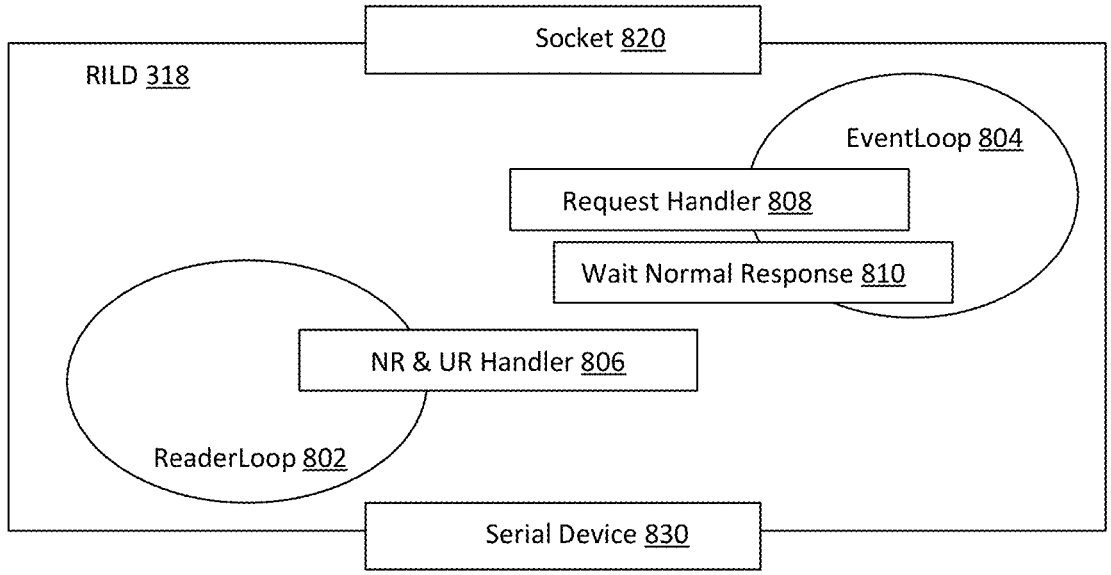
FIG. 8 illustrates an exemplary functional diagram of an RILD for translation mode operation consistent with the disclosed embodiments.

On the other hand, during operation, mobile terminal 120 may also operate in a transparent mode or a translation mode, which may be implemented through RILD 318. FIG. 8 illustrates an exemplary functional diagram of RILD 318 for translation mode operation consistent with the disclosed embodiments.

As shown in FIG. 8, RILD 318 may include a reader loop 802, an event loop 804, a socket 820, and a serial device 830. RILD 318 may receive requests from upper layers and forward responses to the upper layers via socket 820. Event loop 804 may include any appropriate software programs to handle interactions with socket 820. For example, event loop 804 may include a request handler 808 to receive various requests from the upper layers, and a wait normal response 810 to wait to receive responses from voice relay 110. Socket 820 and serial device 830 may be software devices for sending and receiving data.

Further, reader loop 802 may be coupled to serial device 830 to receive responses from voice relay 110, such as normal responses (NR) and unsolicited responses (UR). Reader loop 802 may include an NR&UR handler 806 to handle receiving normal responses from voice relay 110 and unsolicited responses from the network side.

Figure 9:
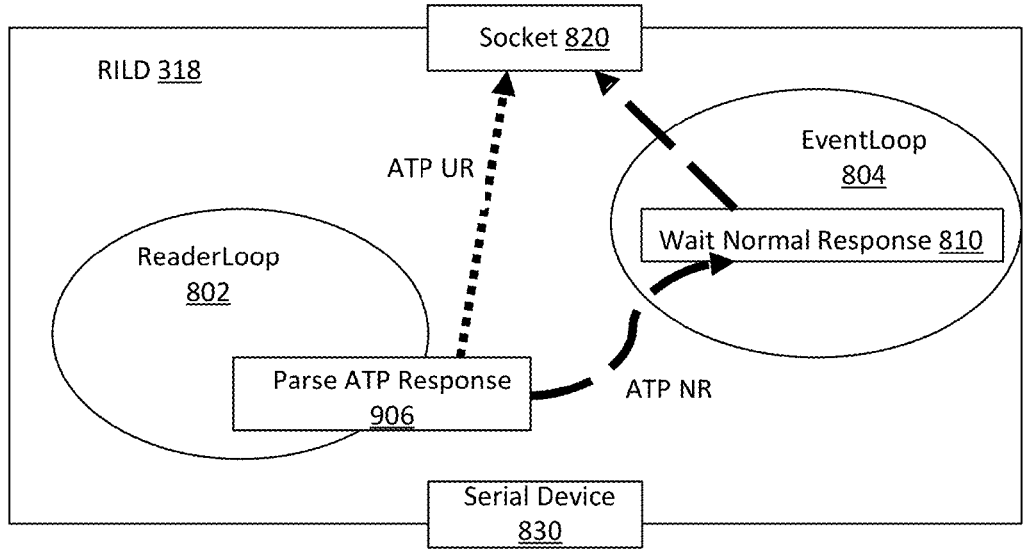
FIG. 9 illustrates another exemplary functional diagram of an RILD for translation mode operation consistent with the disclosed embodiments.

More particularly, as shown in FIG. 9, NR & UR handler 806 may include a parse ATP response 906 to interpret received responses. If the received response is an ATP UR, NR & UR handler 806 or parse ATP response 906 may forward the received ATP UR directly to the upper layers through socket 820 (after the translation, if necessary). On the other hand, if the received response is an ATP NR, NR & UR handler 806 or parse ATP response 906 may forward the received ATP NR to event loop 804, and then wait normal response 810 to process the ATP NR. The processed ATP NR may be forwarded to the upper layers by event loop 804 via socket 820.

Figure 10A:
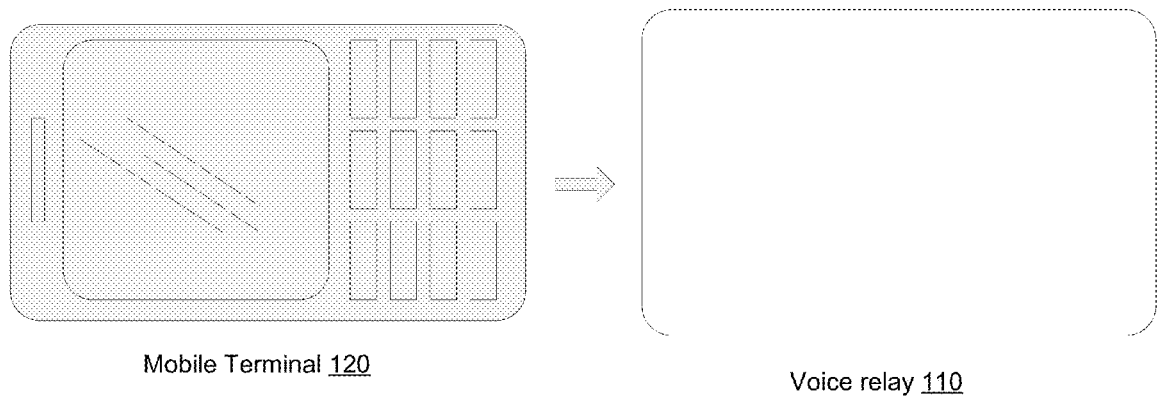
FIGS. 10A-10B illustrate an exemplary configuration of a mobile terminal and a voice relay consistent with the disclosed embodiments.
Figure 10B:
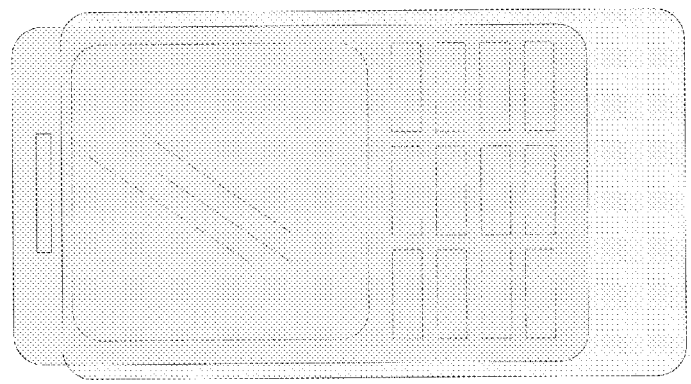

Whether using ATP or AT commands, mobile terminal 120 is coupled to voice relay 110 to support remote man-machine interfaces on mobile terminal 120. Further, voice relay 110 and mobile terminal 120 may interact with each other during operation to perform communication functions. Actual distance between mobile terminal 120 and voice relay 110 may vary, without impacting the communication functions. However, because voice relay 110 is portable, voice relay 110 may be configured to be physically coupled together or integrated with mobile terminal 120 during certain time periods or during operation to provide additional features to significantly improve user experience. Physically coupled voice relay 110 and mobile terminal 120, as used herein, may refer to coupled voice relay 110 and mobile terminal 120 with a direct contact between voice relay 110 and mobile terminal 120. FIGS. 10A and 10B illustrate an exemplary configuration of mobile terminal 120 and voice relay 110 consistent with the disclosed embodiments.

As shown in FIG. 10A, voice relay 110 may be configured as a casing for mobile terminal 120 or any appropriate configuration for containing mobile terminal 120. Mobile terminal 120 may be freely inserted into voice relay 110 such that a user of mobile terminal 120 may be able to place mobile terminal 120 into voice relay 110 and carry both mobile terminal 120 and voice relay 110 together to significantly reduce space and hassles of carrying both mobile terminal 120 and voice relay 110. FIG. 10B shows mobile terminal 120 being placed into voice relay 110.

When mobile terminal 120 is placed in voice relay 110, the communication between mobile terminal 120 and voice relay 110 may be unchanged. When the user needs to use mobile terminal 120 to make or take a call to or from an external phone, the user may take mobile terminal 120 out from the casing (i.e., voice relay 110) and hold mobile terminal 120 during the call. Alternatively, the user may hold the combined mobile terminal 120 and voice relay 110 during the call, without removing mobile terminal 120 from voice relay 110.

Figure 11:
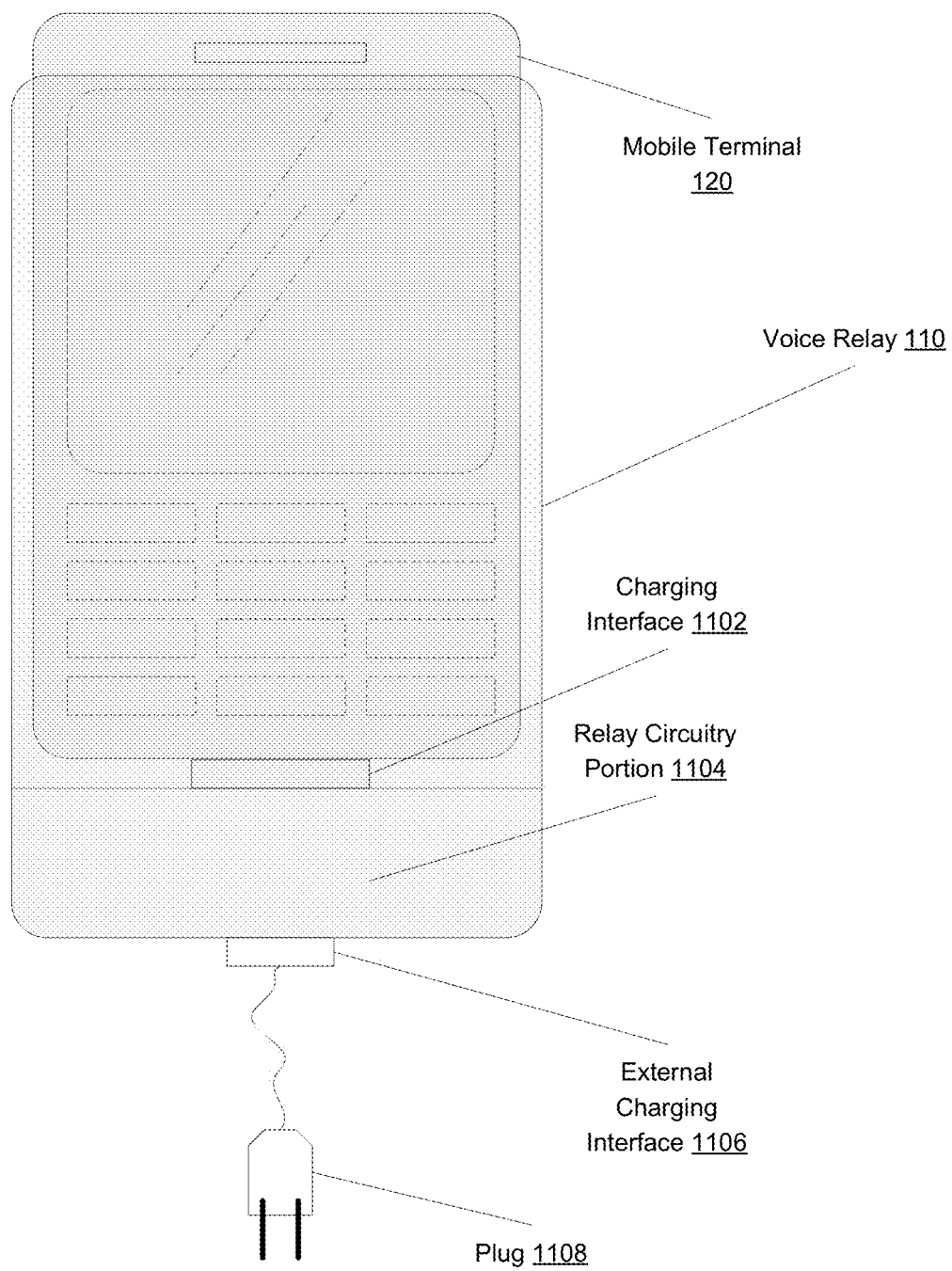
FIG. 11 illustrates another exemplary configuration of a mobile terminal and a voice relay consistent with the disclosed embodiments.

FIG. 11 illustrates another exemplary configuration of mobile terminal 120 and voice relay 110 consistent with the disclosed embodiments. As shown in FIG. 11, similar to FIG. 10B, voice relay 110 may also be configured as a casing for mobile terminal 120, and mobile terminal 120 may be freely inserted into voice relay 110. However, voice relay 110 may also include a charging interface 1102, a relay circuitry portion 1104, an external charging interface 1106, and a plug 1108.

Charging interface 1102 may be provided to connect mobile terminal 120 and voice relay 110 for charging purposes. For example, mobile terminal 120 may receive power from voice relay 110 to charge a battery in mobile terminal 120, or voice relay 110 may receive power from mobile terminal 120 to charge a battery in voice relay 110. Relay circuitry portion 1104 may be provided to host circuitry of voice relay 110 such that voice relay 110 may be configured as a casing for mobile terminal 120. Further, external charging interface 1106 may be provided such that voice relay 110 may charge the battery from an external power source through plug 1108. For example, plug 1108 may be plugged into an AC outlet, voice relay 110 may thus be charged through external charging interface 1106, while mobile terminal 120 may be charged through charging interface 1102. In addition, plug 1108 may include any appropriate type of plug containing a power interface, such as a USB or other interface device.

Figure 12A:
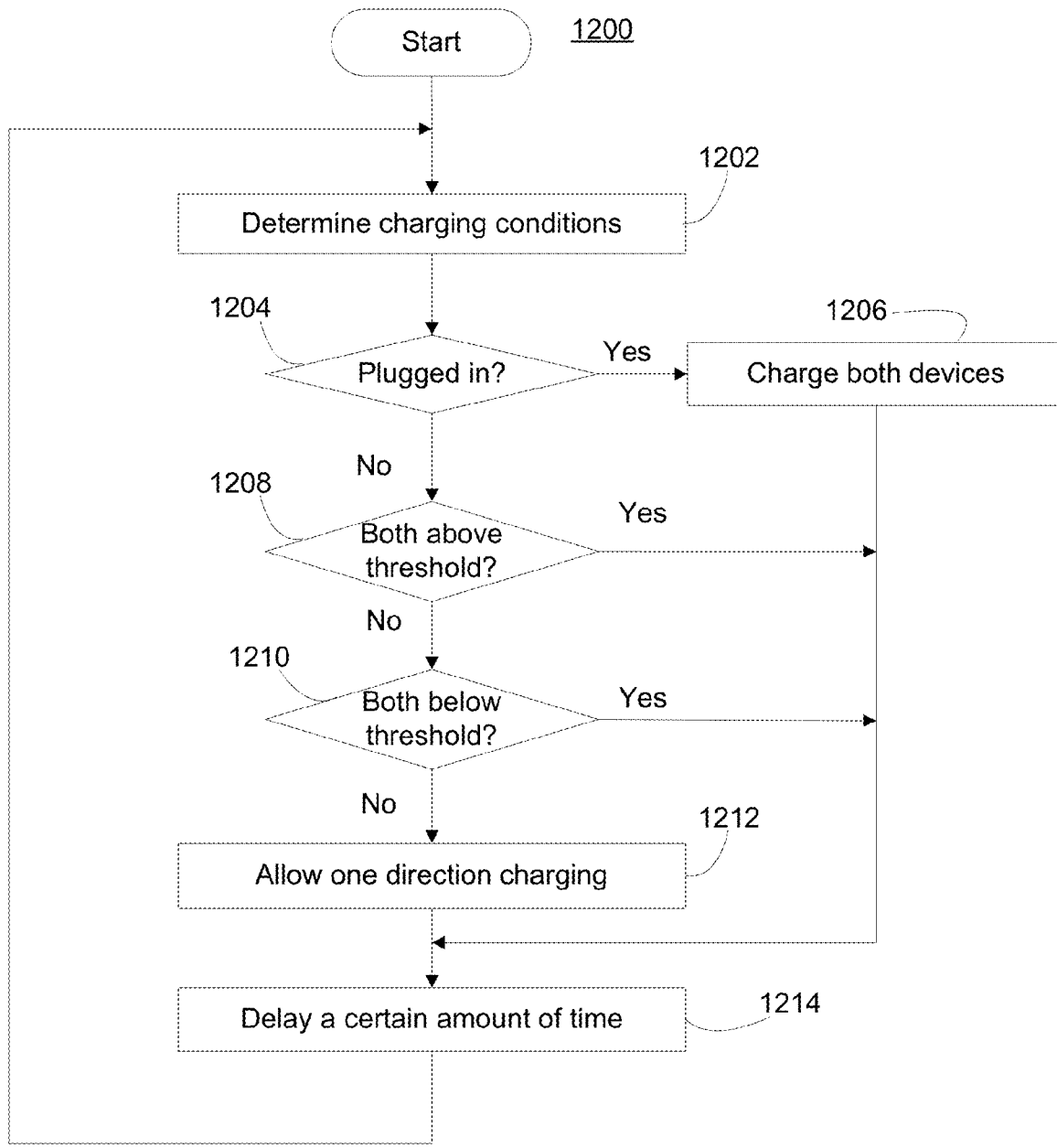
FIG. 12A illustrates an exemplary charging process consistent with the disclosed embodiments.

That is, certain internal systems of mobile terminal 120 and voice relay 110 may be connected together or may interact with each other when mobile terminal 120 is placed into voice relay 110. However, such connection may be only for charging purposes, and data/voice communication between mobile terminal 120 and voice relay 110 may still be carried out through the wireless interface or wireless link between mobile terminal 120 and voice relay 110. Further, a charging process may be provided to control various charging situations when mobile terminal 120 and voice relay 110 are coupled together. FIG. 12A illustrates an exemplary charging process 1200 performed by voice relay 110 (e.g., CPU 202 of voice relay 110) or mobile terminal 120. For the sake of simplicity, voice relay 110 is used to describe the exemplary charging process 1200, though mobile terminal 120 can also perform the process as described.

As shown in FIG. 12A, when mobile terminal 120 and voice relay 110 are coupled together, i.e., mobile terminal 120 is inserted into voice relay 110, voice relay 110 may determine charging conditions for both mobile terminal 120 and voice relay 110 (1202). Charging conditions, as used herein, may refer to various parameters related to power on each of mobile terminal 120 and voice relay 110 and power operations. For example, mobile terminal 120 may obtain conditions on plug 1108, charging interface 1102, charging interface 1106, current battery levels of the batteries in voice relay 110 and mobile terminal 120, and levels of thresholds of both mobile terminal 120 and voice relay 110, etc. Any appropriate power parameters may be included. Alternatively, voice relay 110 and mobile terminal 120 may make determinations and perform actions separately and independently.

Further, voice relay 110 may determine whether plug 1108 is plugged in an AC outlet or other interface (1204). If voice relay 110 determines that plug 1108 is plugged in (1204; Yes), voice relay 110 may allow both mobile terminal 120 and voice relay 110 to charge the batteries (1206). On the other hand, if voice relay 110 determines that plug 1108 is not plugged in (1204; No), voice relay 110 may further determine whether the current power levels of both mobile terminal 120 and voice relay 110 are above the respective thresholds (1208). That is, mobile terminal 120 and voice relay 110 each has a single threshold for determining charging batteries. A power level below the single threshold may indicate a need for recharging, while a power level above the single threshold may indicate an ability to charge other devices.

If voice relay 110 determines that the current power level of voice relay 110 is above the single threshold for voice relays and the current power level of mobile terminal 120 is also above the single threshold for mobile terminals (1208; Yes), voice relay 110 may determine that no further actions are needed (i.e., charging is not necessary), and charging is not enabled. On the other hand, if voice relay 110 determines that the current power levels of voice relay 110 and mobile terminal 120 are not both above the corresponding single thresholds (1208; No), voice relay 110 may further determine whether both current power levels are below the corresponding single thresholds (1210).

If voice relay 110 determines that both current power levels are below corresponding single thresholds (1210; Yes), voice relay 110 may determine that no further actions are needed (i.e., neither is capable of charging other devices), and charging is not allowed for either mobile terminal 120 or voice relay 110. However, if voice relay 110 determines that the current power levels are not both below corresponding single thresholds (1210; No), voice relay 110 may allow one direction charging between mobile terminal 120 and voice relay 110 (1212).

That is, if the current power level of mobile terminal 120 is below its corresponding single threshold while the current power level of voice relay 110 is above its corresponding single threshold, voice relay 110 may act as a power source to charge mobile terminal 120 until the power level of mobile terminal 120 reaches a predetermined level or a same level as voice relay 110. On the other hand, if the current power level of voice relay 110 is below its corresponding single threshold while the current power level of mobile terminal 120 is above its corresponding single threshold, mobile terminal 120 may act as a power source to charge voice relay 110 until the power level of voice relay 110 reaches a predetermined level or a same level as mobile terminal 120. The charging process may be repeated during operation after delaying a certain amount of time, predetermined by the user or by voice relay 110 (1214). Other power management methods may also be used.

Figure 12B:
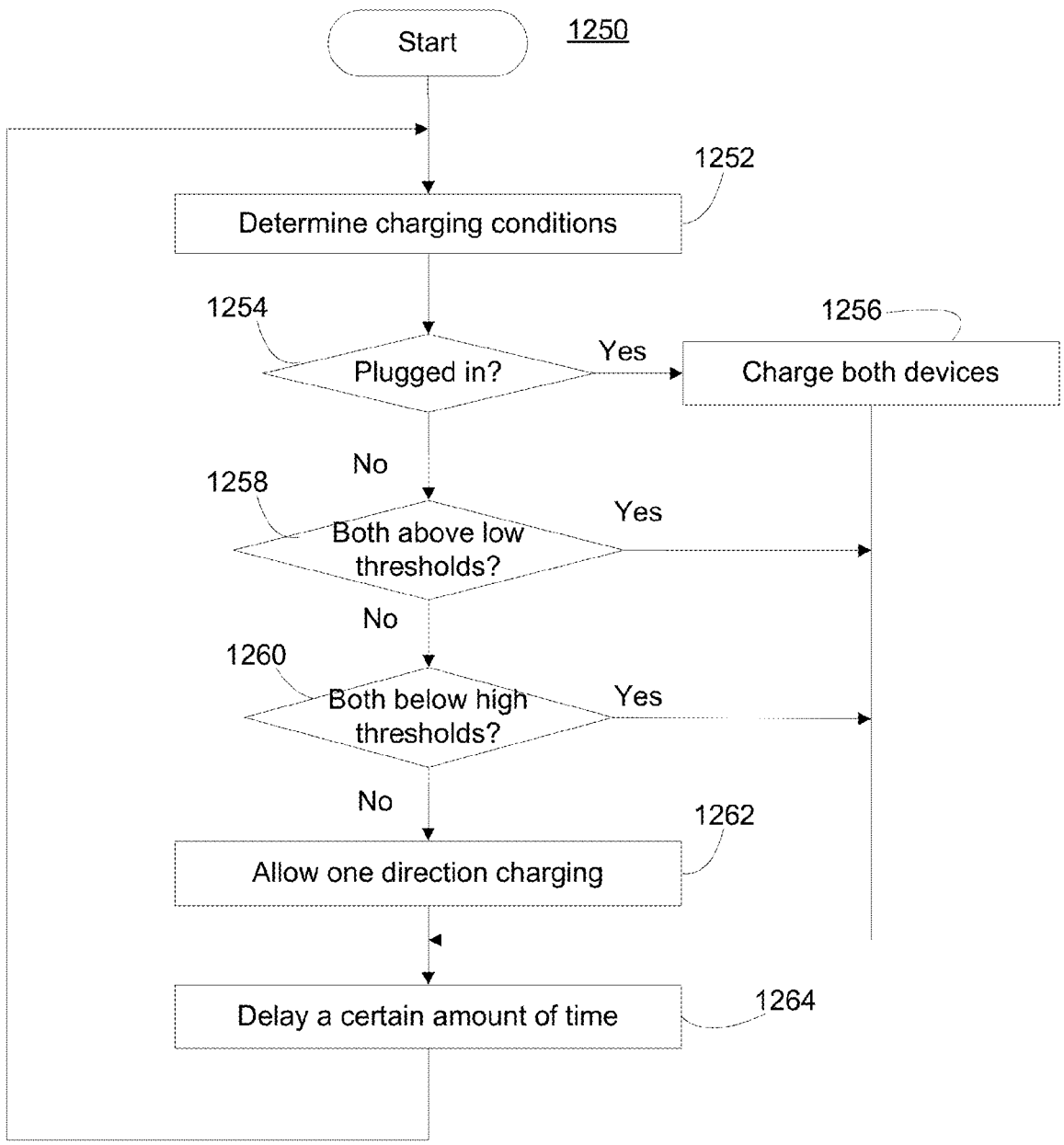
FIG. 12B illustrates another exemplary charging process consistent with the disclosed embodiments.

In FIG. 12A, a single threshold is used in mobile terminal 120 and voice relay 110. However, more than one thresholds may also be used. FIG. 12B illustrates another exemplary charging process 1250 performed by voice relay 110 (e.g., CPU 202 of voice relay 110) or mobile terminal 120 based on two thresholds, a high threshold and a low threshold. A high threshold may indicate that the battery is in a good or full condition, and is capable of charging other devices, and a low threshold may indicate that the power level is at a level where the battery may need to be recharged, an energy saving mode should be used, e.g., unable to act as a power source to charge other devices. Other thresholds may also be used.

As shown in FIG. 12B, voice relay 110 may perform 1252, 1254, and 1256 similar to 1202, 1204, and 1206 in FIG. 12A. Further, voice relay 110 may determine whether the current power levels of both mobile terminal 120 and voice relay 110 are above the respective low thresholds (1258).

If voice relay 110 determines that the current power level of voice relay 110 is above the low threshold for voice relays and the current power level of mobile terminal 120 is also above the low threshold for mobile terminals (1258; Yes), voice relay 110 may determine that no further actions are needed (i.e., charging is not necessary), and charging is not enabled. However, if voice relay 110 determines that the current power levels are not both above the corresponding low thresholds (1258; No), voice relay 110 may further determine whether the current power levels are below the respective high thresholds (1260).

If voice relay 110 determines that both current power levels are below the corresponding high thresholds (1260; Yes), voice relay 110 may determine that no further actions are needed (i.e., incapable of charging other devices), and charging is not allowed for either mobile terminal 120 or voice relay 110. However, if voice relay 110 determines that the current power levels are not below corresponding high thresholds (1260; No), voice relay 110 may allow one direction charging between mobile terminal 120 and voice relay 110 (1262).

That is, if the current power level of mobile terminal 120 is below the low threshold while the current power level of voice relay 110 is above the high threshold, voice relay 110 may act as a power source to charge mobile terminal 120 until the power level of mobile terminal 120 reaches a predetermined level (e.g., the low threshold) or a same level as voice relay 110. On the other hand, if the current power level of voice relay 110 is below the low threshold while the current power level of mobile terminal 120 is above the high threshold, mobile terminal 120 may act as a power source to charge voice relay 110 until the power level of voice relay 110 reaches a predetermined level or a same level as mobile terminal 120. The charging process may be repeated during operation after delaying a certain amount of time, predetermined by the user or by voice relay 110 (1264). Other power management methods may also be used.

Figure 13:
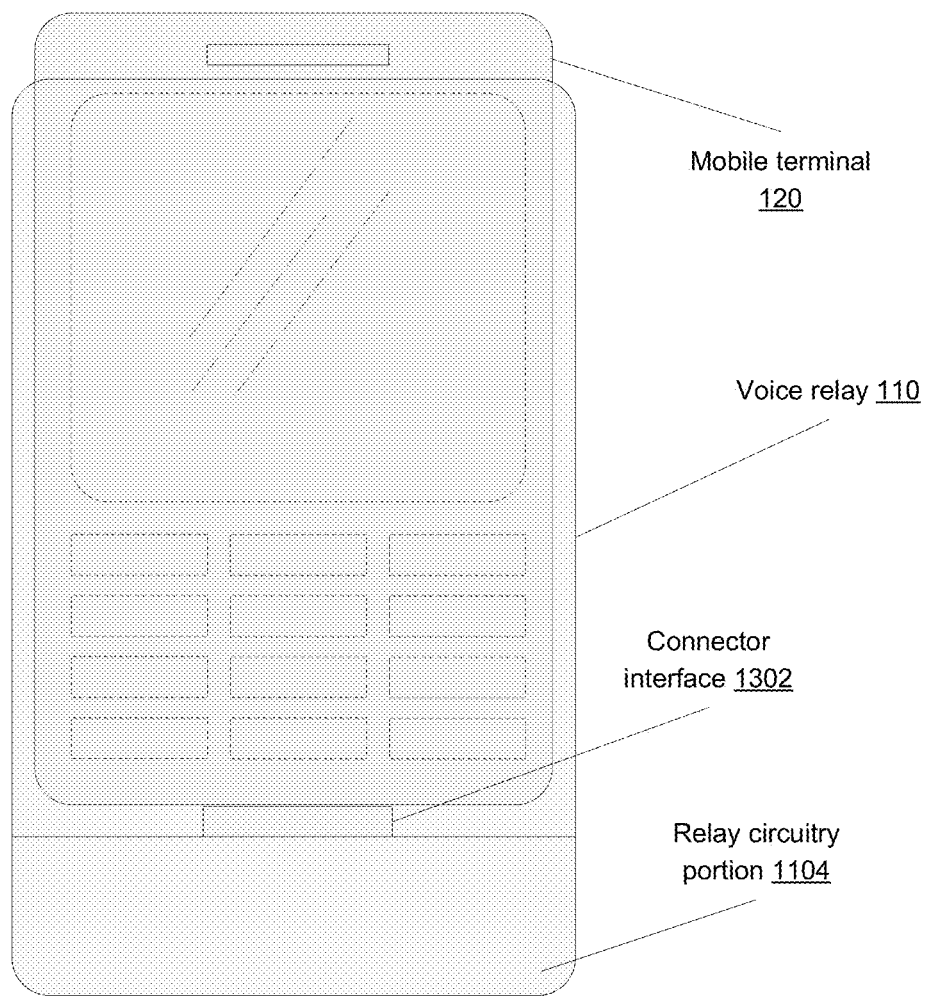
FIG. 13 illustrates another exemplary configuration of a mobile terminal and a voice relay consistent with the disclosed embodiments.
Figure 14:
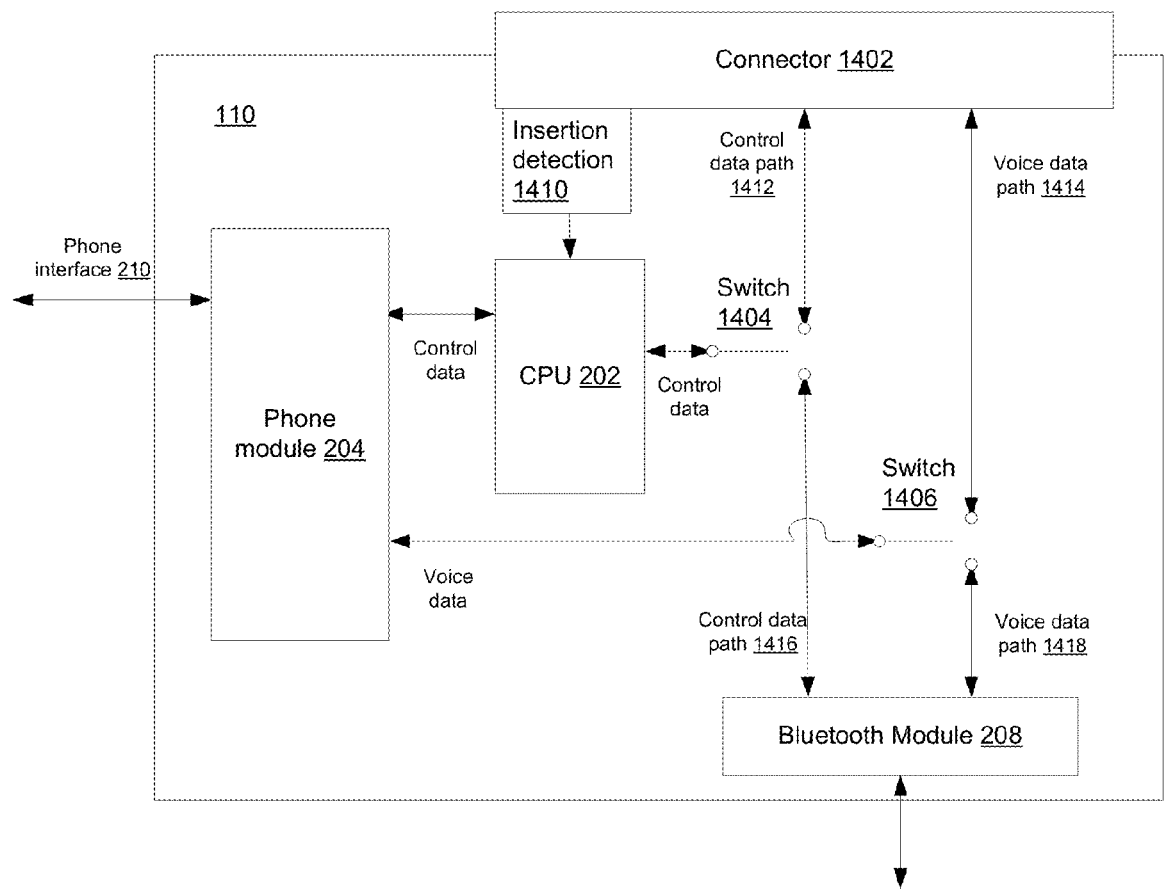
FIG. 14 illustrates an exemplary configuration of a voice relay consistent with the disclosed embodiments.
Figure 15:
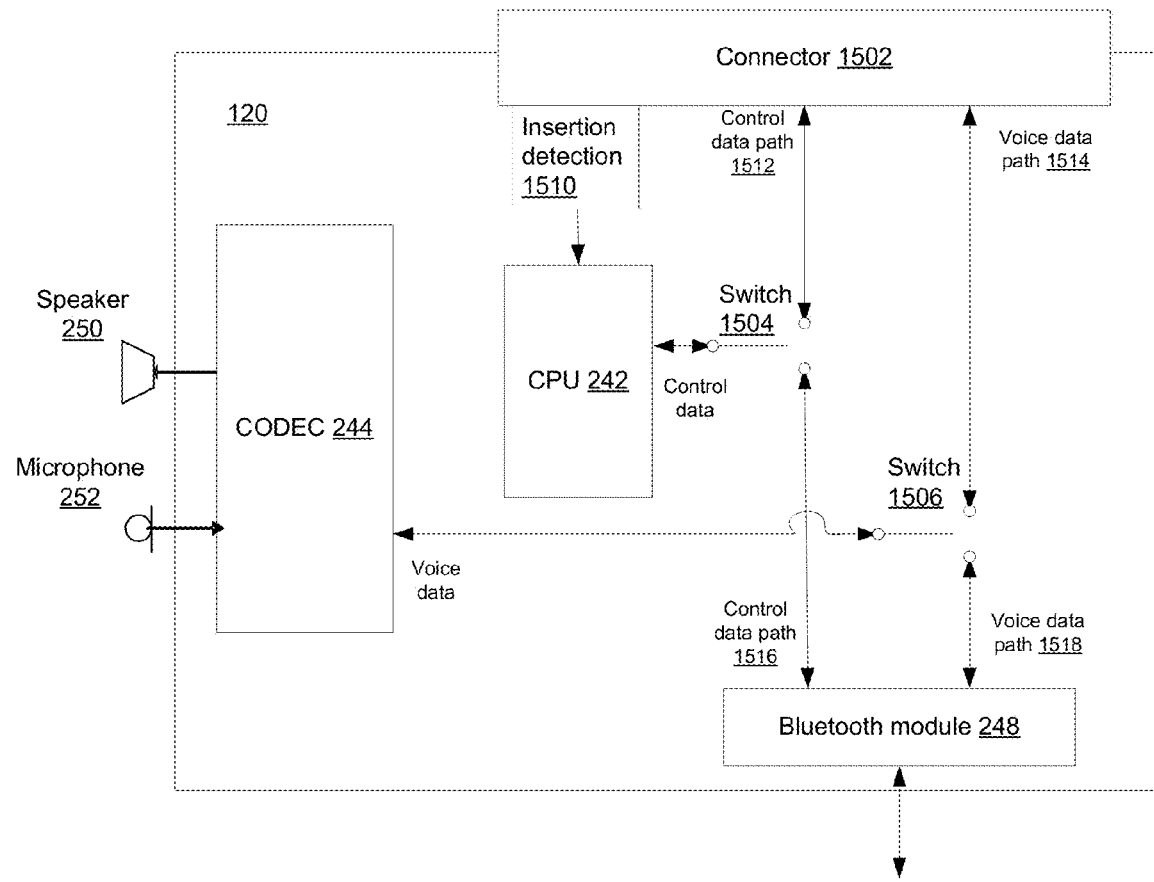
FIG. 15 illustrates an exemplary configuration of a mobile terminal consistent with the disclosed embodiments.

FIG. 13 illustrates another exemplary configuration of mobile terminal 120 and voice relay 110 consistent with the disclosed embodiments. As shown in FIG. 13, similar to FIG. 12, voice relay 110 may also be configured as a casing for mobile terminal 120, and mobile terminal 120 may be freely inserted into voice relay 110, and mobile terminal 120 may be physically coupled with voice relay 110. However, voice relay 110 may also include a connector interface 1302, which may include a charging interface (e.g., charging interface 1102) as well as a data interface for exchanging data between mobile terminal 120 and voice relay 110 over a wire-connection link. That is, connector interface 1302 provides communication channels for control link 218 and voice link 220 (shown in FIG. 2) through a direct connection. FIG. 14 and FIG. 15 illustrate exemplary configurations of voice relay 110 and mobile terminal 120, respectively.

As shown in FIG. 14, voice relay 110 may include a connector 1402, a switch 1404, a switch 1406, and an insertion detection unit 1410, in addition to other components, such as CPU 202, phone module 204, and Bluetooth module 208. Connector 1402 (e.g., data interface) may include any appropriate connection devices using cable, bus, or other connection methods. Connector 1402 may include a control data path 1412 and a voice data path 1414, which can be either physical or logical data paths. Control data path 1412 may include a data bus for carrying control data and voice data path 1414 may include a data bus for carrying voice data. Other data path(s) may also be included. Further, Bluetooth module 208 may provide control data path 1416 and voice data path 1418 for carrying control data and voice data, respectively.

Connector 1402 may also include insertion detection unit 1410 to detect an insertion of mobile terminal 120 into connector 1402 or a removal of mobile terminal 120 from connector 1402, and to send an corresponding insertion event or a removal event to CPU 202. Further, switch 1404 may be configured to switch between control data path 1412 and control data path 1416, and switch 1406 may be configured to switch between voice data path 1414 and voice data path 1418. That is, switch 1404 and switch 1406 are configured to select between connector 1402 and Bluetooth module 208 as the physical medium to carry control link 218 and voice link 220 between voice relay 110 and mobile terminal 120. Switch 1404 and/or switch 1406 may include any appropriate hardware or software switches. Alternatively, switch 1404 and/or switch 1406 may be configured to connect both control data path 1412 and control data path 1416 to CPU 202 and/or both voice data path 1414 and voice data 1418 to phone module 204, such that CPU 202/phone module 204 may determine which control data path or voice data path to use.

Corresponding to voice relay 110, as shown in FIG. 15, mobile terminal 120 may include a connector 1502, a switch 1504, a switch 1506, and an insertion detection unit 1510, in addition to other components, such as CPU 242, CODEC 244, speaker 250, microphone 252, and Bluetooth module 248. Connector 1502 may include any appropriate connection devices using cable, bus, or other connection methods, and may couple to connector 1402 of voice relay 110.

Further, connector 1502 may include a control data path 1512 and a voice data path 1514. Control data path 1512 may include a data bus for carrying control data and voice data path 1514 may include a data bus for carrying voice data. Other data paths may also be included. Further, Bluetooth module 248 may provide control data path 1516 and voice data path 1518 for carrying control data and voice data, respectively.

Connector 1502 may also include insertion detection unit 1510 to detect an insertion of mobile terminal 120 into connector 1402 of voice relay 110 or a removal of mobile terminal 120 from connector 1402 of voice relay 110, and to send an insertion event or a removal event to CPU 242. Further, switch 1504 may be configured to switch between control data path 1512 and control data path 1516, and switch 1506 may be configured to switch between voice data path 1514 and voice data 1518. That is, switch 1504 and switch 1506 are configured to select between connector 1502 and Bluetooth module 248 as the physical medium to carry control link 218 and voice link 220 between mobile terminal 120 and voice relay 110. Switch 1504 and/or switch 1506 may include any appropriate hardware or software switches. Alternatively, switch 1504 and/or switch 1506 may be configured to connect both control data path 1512 and control data path 1516 to CPU 242 and/or both voice data path 1514 and voice data 1518 to CODEC 244 or other voice circuitry, such that CPU 242/CODEC 244 may determine which control data path or voice data path to use.

Figure 16:
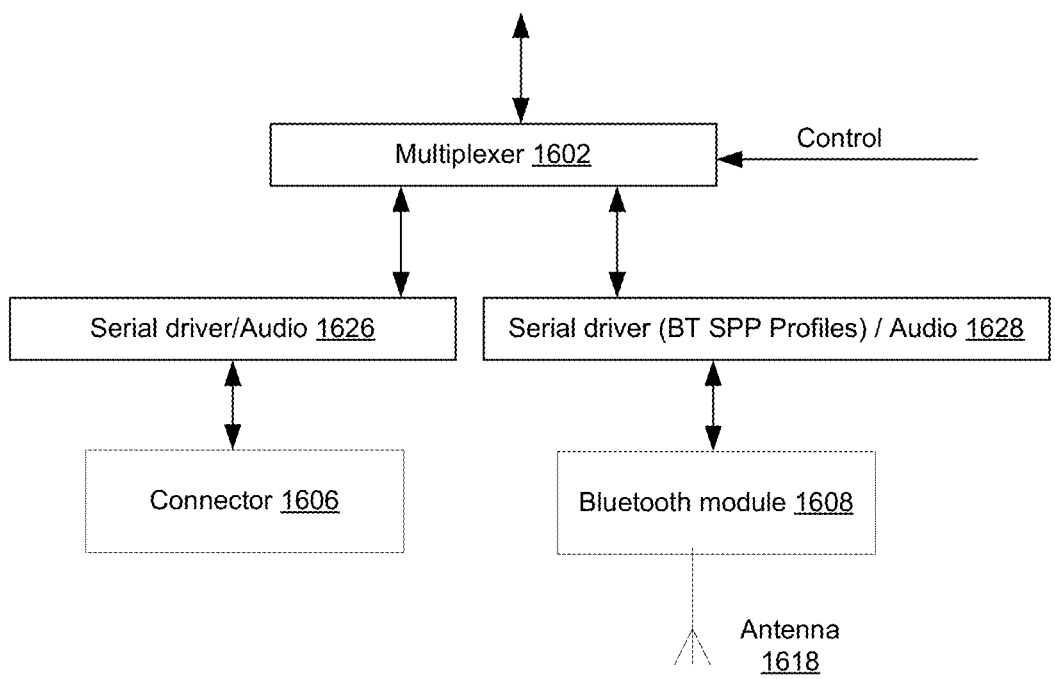
FIG. 16 illustrates an exemplary configuration to integrate a connector interface consistent with the disclosed embodiments.

Corresponding to the various configurations with the addition of the connector interface 1302 (connector 1402 and connector 1502), hardware and software (e.g., FIG. 3 and FIG. 7) on voice relay 110 and mobile terminal 120 may also be configured to integrate the connector interface 1302. FIG. 16 illustrates an exemplary configuration to integrate connector interface 1302 with respect to both voice relay 110 and mobile terminal 120.

As shown in FIG. 16, similar to FIG. 3 and FIG. 7, serial driver/audio 1628 (e.g., serial port driver 322, CODEC 244) is provided to interface Bluetooth module 1608 (Bluetooth module 208 and Bluetooth module 248) such that Bluetooth module 1608 can be incorporated in the operating system on voice relay 110 and mobile terminal 120, without changing the operating system. That is, serial driver/audio 1628 carries both control data and audio or voice data to Bluetooth module 1608. Control data and voice data are then sent to Bluetooth module 1608 and transmitted by antenna 1618 (e.g., antenna 728 and antenna 342) over same or different channels, and control data and voice data received from Bluetooth module 1608 are delivered to serial driver/audio 1628 to be sent to applications. Further, serial driver/audio 1626 is provided to interface connector 1606 such that connector 1606 can be incorporated in the operating system on voice relay 110 and mobile terminal 120, without changing the operating system. That is, serial driver/audio 1626 carries both control data and audio or voice data to connector 1606. Control data and voice data are then sent to connector 1606 and transmitted on the control data path and voice or audio data path in connector 1606. Control data and voice data received from connector 1606 are delivered to serial driver/audio 1626 to be sent to applications. Serial driver 1626 may be configured in such a way that serial driver/audio 1626 and connector 1606 simulates serial driver/audio 1628, and the applications may be unable to tell the difference whether the physical medium between mobile terminal 120 and voice relay 110 is the connector interface or the Bluetooth interface. Switches 1404 and 1406 or switches 1504 and 1506 may be used to switch the connector interface and the Bluetooth interface.

Optionally, a multiplexer 1602 may be provided to select one of serial driver/audio 1628 and serial driver/audio 1626 under control of a CPU (e.g., CPU 202 or 242) to use. That is, the control data and voice data may be carried by either the Bluetooth interface (e.g., Bluetooth modules 208 and 248) or the connector interface (e.g., connectors 1402 and 1502). Multiplexer 1602 may include a software program or a hardware device, or both. Alternatively, control data and voice data may be separately carried by serial driver/audio 1628 and the connector interface, and serial driver/audio 1626 and the Bluetooth interface. Thus, these pre-configured serial drivers and/or audio path control software (e.g., 1626, 1628) or simply-called control software modules can couple the connector interface and the Bluetooth interface to the operating system and application programs, and these control software modules also become exchangeable parts of the operating system.

Figure 17:
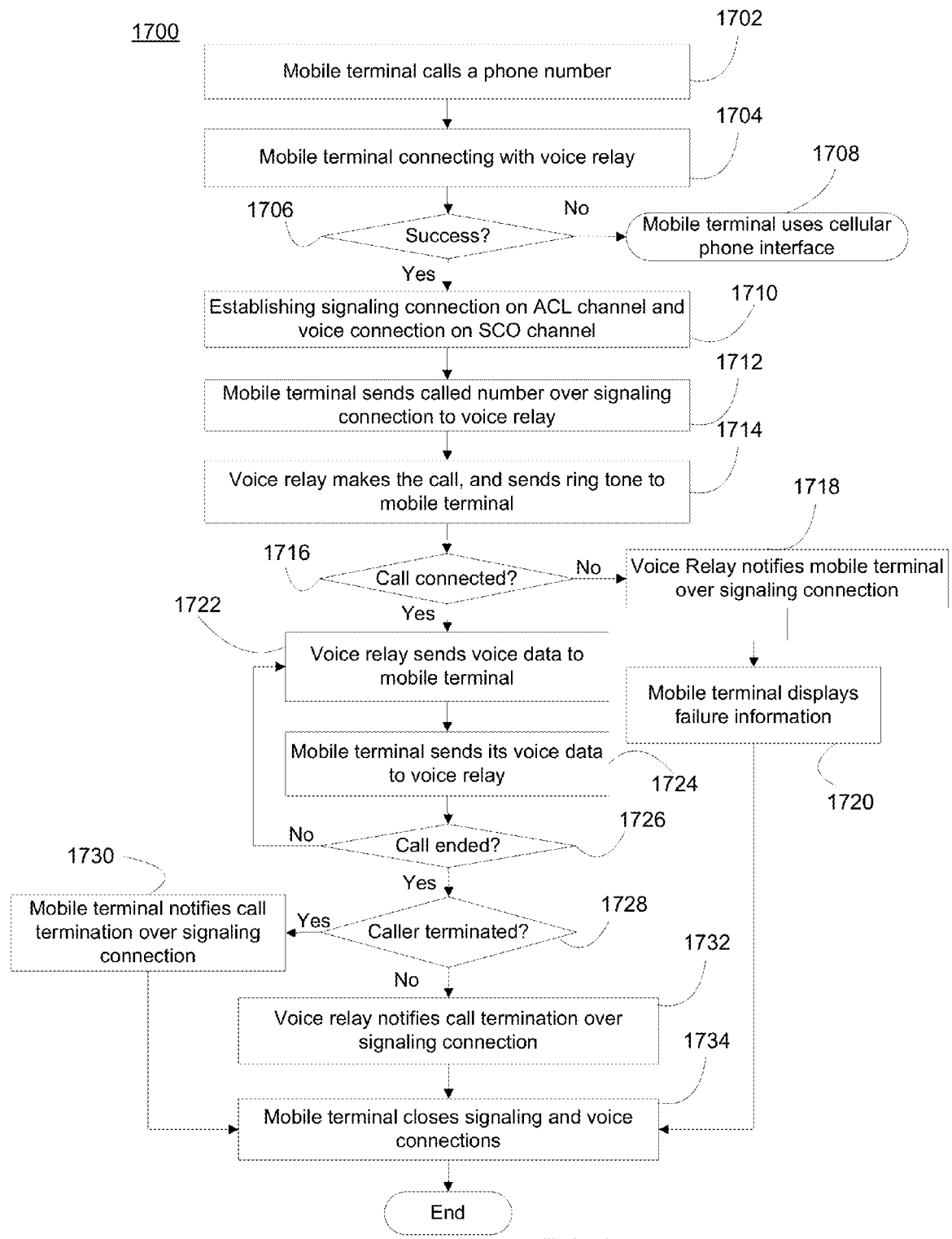
FIG. 17 illustrates an exemplary outgoing call process consistent with the disclosed embodiments.

In operation, voice relay 110 and mobile terminal 120 can use either connector 1606 or Bluetooth module 1608 to communicate with each other such that a user on mobile terminal 120 can take or make a call using voice relay 110. FIG. 17 shows an exemplary outgoing call process 1700 via either connector 1606 or Bluetooth module 1608 consistent with the disclosed embodiments.

As shown in FIG. 17, at the beginning, mobile terminal 120 decides to initiate an outgoing call to a particular phone number (1702). For example, a user of mobile terminal 120 may use a graphic user interface (GUI), such as a phone key pad interface or similar GUIs, to make a call by entering the phone number to be called. After the user made the call, mobile terminal 120 may indicate to the user that the call is being made. Further, mobile terminal 120 may try to connect with voice relay 110 via either the Bluetooth interface or the connector interface (1704).

Mobile terminal 120 may further determine whether the connection to voice relay 110 is a success (1706). If mobile terminal 120 determines that the connection to voice relay 110 is not a success (1706, No), mobile terminal 120 may use a cellular phone interface, such as a WCDMA, CDMA, GSM, WiMAX, or LTE interface to make the outgoing call (1708).

On the other hand, if mobile terminal 120 determines that the connection to voice relay 110 is a success (1706, Yes), mobile terminal 120 may establish a signaling connection on an asynchronous connection-oriented logical (ACL) transport channel, and a voice connection on a synchronous connection oriented (SCO) channel (1710). Other configurations may also be used.

Further, mobile terminal 120 may send called number and other call-related information to voice relay 110 over the established signaling connection (1712). As previously explained, mobile terminal 120 may also support a transparent mode and a translation mode and may use AT commands or ATP commands depending on an operation mode of voice relay 110. For example, mobile terminal 120 may use AT commands if voice relay 110 is in a transparent mode, or may use ATP commands if voice relay 110 is in a translation mode.

Voice relay 110 may make the outgoing call using phone module 204 and may also send a ring tone to mobile terminal 120 (1714). Voice relay 110 may also determine whether the call is connected (1716). If voice relay 110 determines that the call is not connected (1716, No), voice relay 110 may notify mobile terminal 120 of the failure over the signaling connection (1718). Voice relay 110 may also send failure causes, such as busy or not turned on, etc. Mobile terminal 120 may display the call failure along with failure causes to the user on the GUI (1720). Further, mobile terminal 120 may close both signaling connection and voice connection (1734).

On the other hand, if voice relay 110 determines that the call is connected (1716, Yes), voice relay 110 may send voice data of the connected call to mobile terminal 120 over the voice connection (1722). Mobile terminal 120 may receive the voice data from voice relay 110 and may also send new voice data related to the call to voice relay 110 to be forwarded to the external phone device (1724).

Further, voice relay 110 may determine whether the call is ended (1726). If the call is not ended (1726, No), voice relay 110 continues sending voice data to mobile terminal 120 (1722). However, if the call is ended (1726, Yes), voice relay 110 and mobile terminal 120 may further determine whether the call is terminated by the caller, i.e., mobile terminal 120 (1728).

If the call is terminated by the caller (1728, Yes), mobile terminal 120 may notify voice relay 110 of the call termination over signaling connection such that voice relay 110 can terminate the call on the network side (1730), and mobile terminal 120 may close both signaling connection and voice connection (1734).

On the other hand, if the call is not terminated by the caller (1728, No), that is, the network side terminated the call, voice relay 110 may notify mobile terminal 120 of the call termination over the signaling connection (1732), and mobile terminal 120 may close both signaling connection and voice connection (1734).

Figure 18:
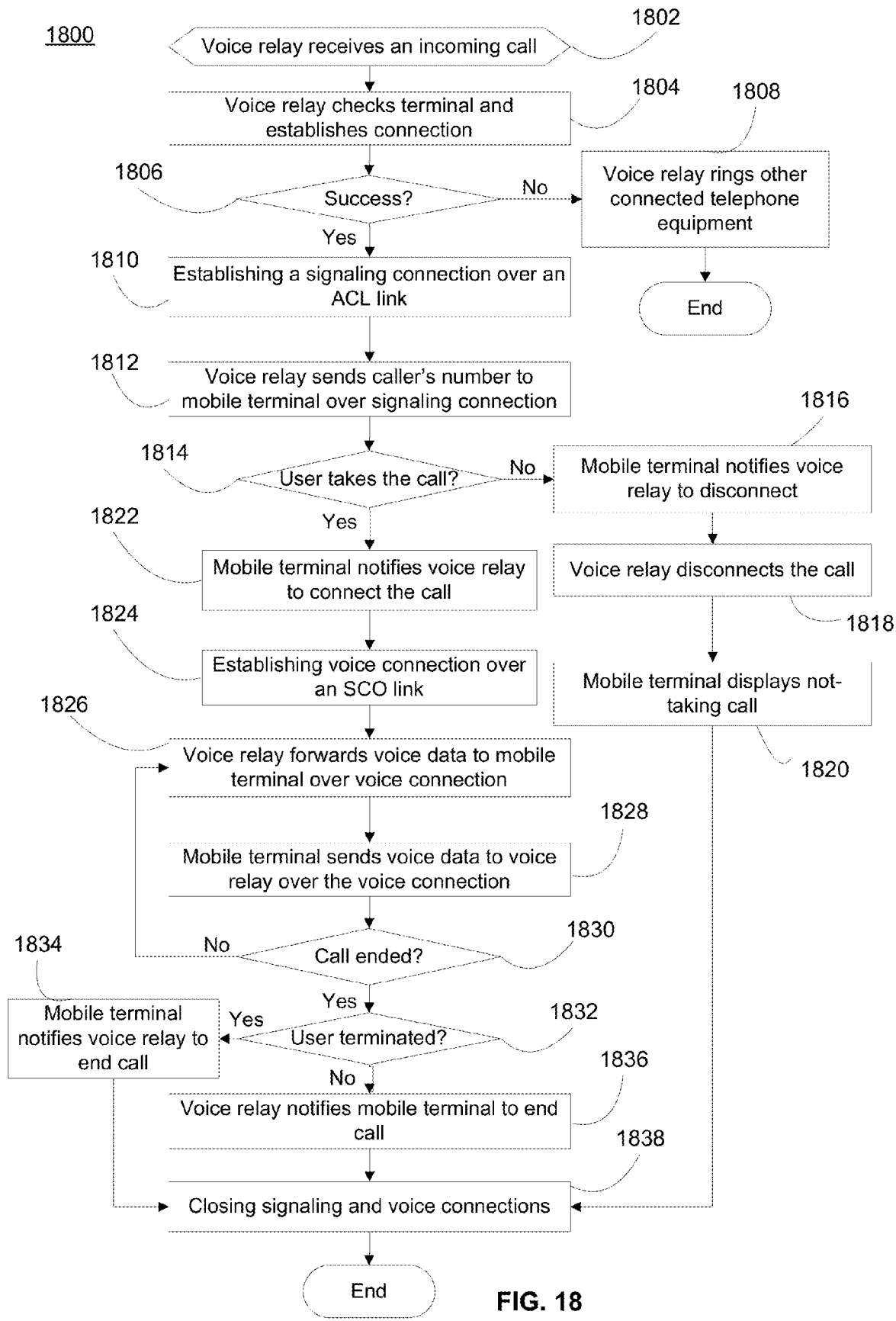
FIG. 18 illustrates an exemplary incoming call process consistent with the disclosed embodiments.

FIG. 18 shows an exemplary incoming call process 1800 via either connector 1606 or Bluetooth module 1608 consistent with the disclosed embodiments. As shown in FIG. 18, at the beginning, voice relay 110 receives an incoming call via phone module 204 (1802). After voice relay 110 receives the incoming call, voice relay 110 may check the incoming call and may determine a mobile terminal 120 that is pre-configured to receive the incoming call or is available to receive the incoming call. Voice relay 110 may establish a connection to the mobile terminal 120 via the Bluetooth interface or the connector interface (1804).

Further, voice relay 110 may determine whether the connection to the mobile terminal 120 is a success (1806). If voice relay 110 determines that the connection to the mobile terminal 120 is not a success (1806, No), voice relay 110 may ring other connected telephone equipment to indicate the incoming call and/or the unavailability of the mobile terminal 120 (1808) and may complete the incoming process afterwards.

On the other hand, if voice relay 110 determines that the connection to the mobile terminal 120 is a success (1806, Yes), voice relay 110 may establish a signaling connection over an ACL connection (1810) and may send caller's phone number to the mobile terminal 120 over the established signaling connection (1812).

After receiving the caller's information from voice relay 110, the mobile terminal 120 may notify the user about the incoming call on the GUI, and may determine whether the user takes the incoming call (1814). If the user does not take the incoming call (1814, No), the mobile terminal 120 may notify voice relay 110 to disconnect the incoming call (1816). Voice relay 110 may thus disconnect the incoming call (1818) and the mobile terminal 120 may display not-taking call to the user over the GUI (1820). Further, mobile terminal 120 may close both signaling connection and voice connection (1838).

On the other hand, if the user takes the incoming call (1814, Yes), the mobile terminal 120 may notify voice relay 110 to connect the incoming call (1822). Voice relay 110 may further establish a voice connection to the mobile terminal 120 over an SCO connection (1824).

After establishing the voice connection to the mobile terminal 120, voice relay 110 may forward voice data to the mobile terminal 120 over the voice connection (1826). Mobile terminal 120 may receive the voice data from voice relay 110 and may also send new voice data related to the incoming call to voice relay 110 to be forwarded to the external phone device (1828).

Further, voice relay 110 may determine whether the call is ended (1830). If the call is not ended (1830, No), voice relay 110 continues sending voice data to mobile terminal 120 (1826). However, if the call is ended (1830, Yes), voice relay 110 and mobile terminal 120 may further determine whether the call is terminated by the user, i.e., mobile terminal 120 (1832).

If the call is terminated by the user (1832, Yes), mobile terminal 120 may notify voice relay 110 of the call termination over signaling connection such that voice relay 110 can terminate the call on the network side (1834), and mobile terminal 120 may close both signaling connection and voice connection (1838).

On the other hand, if the call is not terminated by the user (1832, No), that is, the network side terminated the call, voice relay 110 may notify mobile terminal 120 of the call termination over the signaling connection and end the call (1836), and mobile terminal 120 may close both signaling connection and voice connection (1838).

Figure 19:
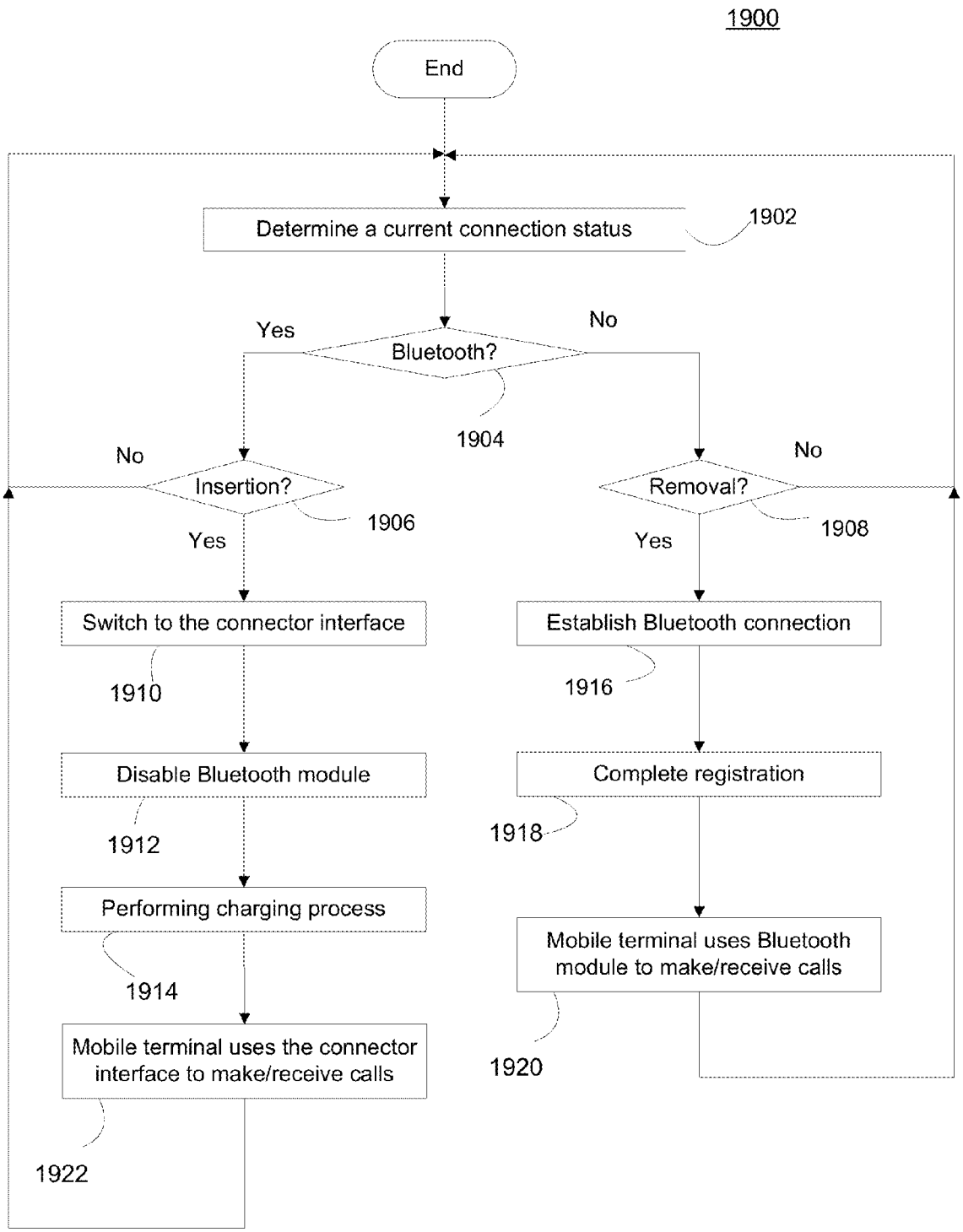
FIG. 19 illustrates an exemplary switching process consistent with the disclosed embodiments.

In addition, as previously explained, the user may insert/remove mobile terminal 120 into/from voice relay 110 from time to time, voice relay 110 and mobile terminal 120 may switch between the connector interface and the Bluetooth interface. FIG. 19 illustrates an exemplary switching process 1900 consistent with the disclosed embodiments. As shown in FIG. 19, voice relay 110 and/or mobile terminal 120 may determine a current connection status (1902). For example, voice relay 110 and/or mobile terminal 120 may determine the status of the Bluetooth interface and the status of the connector interface. Voice relay 110 and/or mobile terminal 120 may then determine whether the connection is via the Bluetooth interface (1904). If voice relay 110 and/or mobile terminal 120 determines that the connection is via the Bluetooth interface (1904; Yes), voice relay 110 and/or mobile terminal 120 may wait for a next possible insertion event or a timeout event (1906). On the other hand, if voice relay 110 and/or mobile terminal 120 determines that the connection is not via the Bluetooth interface (1904; No), i.e., the connection is via the connector interface, voice relay 110 and/or mobile terminal 120 may wait for a next possible removal event or a timeout event (1908).

The insertion event may be generated by hardware and/or software on voice relay 110 and/or mobile terminal 120 to indicate that mobile terminal 120 is inserted into the casing of voice replay 110. If voice relay 110 and/or mobile terminal 120 determine that the insertion event did not happen (1906; No), voice relay 110 and/or mobile terminal 120 continue the switching process from beginning.

However, if voice relay 110 and/or mobile terminal 120 determine that insertion event happened (1906; Yes), voice relay 110 and/or mobile terminal 120 may switch the connection to the connector interface between voice relay 110 and mobile terminal 120 (1910). Optionally, voice relay 110 and/or mobile terminal 120 may also disable the Bluetooth interface (e.g., Bluetooth module 208 and/or Bluetooth module 248) (1912). In addition, voice relay 110 and/or mobile terminal 120 may also perform a charging process as described in FIG. 12 (1914). Thus, mobile terminal 120 may use the connector interface to make/receive calls (1922). Other actions may also be performed.

The removal event may be generated by hardware and/or software on voice relay 110 and/or mobile terminal 120 to indicate that mobile terminal 120 is removed from the casing of voice replay 110. If voice relay 110 and/or mobile terminal 120 determine that the removal event did not happen (1908; No), voice relay 110 and/or mobile terminal 120 continue the switching process from beginning.

However, if voice relay 110 and/or mobile terminal 120 determine that removal event happened (1908; Yes), voice relay 110 and/or mobile terminal 120 may switch the connection from the connector interface to the Bluetooth interface, and voice relay 110 and mobile terminal 120 may establish a Bluetooth connection (1916). If the Bluetooth interface (e.g., Bluetooth module 208 and/or Bluetooth module 248) is disabled, voice relay 110 and/or mobile terminal 120 may also enable the Bluetooth interface first and perform secure pairing and channel negotiation to establish communication channels between voice relay 110 and mobile terminal 120.

Further, voice relay 110 and mobile terminal 120 may also complete a registration process (1918). For example, mobile terminal 120 may request to register with voice relay 110, and voice relay 110 may search a registration database to determine whether a requesting mobile terminal 120 is on a registration list. The registration database may include registration information of a plurality of mobile terminals that are allowed to be registered with voice relay 110. If voice relay 110 finds the requesting mobile terminal 120 on the registration list, voice relay 110 may complete the registration such that voice data communication may be started. If the registration fails, mobile terminal 120 may use a cellular interface to make/receive calls. Further, voice relay 110 and mobile terminal 120 may switch data from the connector interface to the Bluetooth interface. Thus, mobile terminal 120 may use the Bluetooth interface to make/receive calls (1920). Other actions may also be performed.

The disclosed systems and methods may provide many advantageous applications. For example, by using the disclosed systems and methods a cellular phone user can significantly reduce the level of radiation, improve communication quality by using a voice relay, and reduce cost of cellular phone usages. The user can also use the voice relay as an active casing to significantly reduce carrying space and improve user experience. Other advantages and applications are understood by those skilled in the art.

What is claimed is:

1. A wireless communication system, comprising:
   a wireless relay coupled to a phone network; and
   a mobile terminal physically coupled to the wireless relay to make a voice communication with the phone network via the wireless relay,
   wherein the mobile terminal and the wireless relay exchange control data and voice data corresponding to the voice communication over a short-range wireless link based on one of a transparent mode and a translation mode,
   a signaling connection is established on an asynchronous connection-oriented logical (ACL) transport channel between the mobile terminal and the wireless relay for exchanging the control data, and a voice connection is established on a synchronous connection oriented (SCO) channel between the mobile terminal and the wireless relay for exchanging the voice data,
   the mobile terminal is connected to the wireless relay through a connector interface including a charging interface and a data interface to provide a wired-connection link between the wireless relay and the mobile terminal,
   the connector interface further includes an insertion detection unit configured to generate an insertion event when the mobile terminal is inserted into the wireless relay and a removal event when the mobile terminal is removed from the wireless relay,
   wherein the wireless relay or the mobile terminal is further configured to:
      determine a current connection status;
      when the current connection status is the short-range wireless link, wait for the insertion event from the insertion detection unit; and
      when the current connection status is the wired-connection link, wait for the removal event from the insertion detection unit.

2. The wireless communication system according to claim 1, wherein:
   the short-range wireless link is a Bluetooth wireless link.

3. The wireless communication system according to claim 1, wherein:
   the wireless relay is configured as a casing for the mobile terminal.

4. The wireless communication system according to claim 1, wherein:
   the mobile terminal is connected to the wireless relay through a charging interface.

5. The wireless communication system according to claim 4, wherein the wireless relay includes an external power plug and is configured to:
   determine charging conditions; and
   when the external power plug is plugged into power interface, charge the wireless relay and the mobile terminal through the charging interface.

6. The wireless communication system according to claim 1, wherein:
   the data interface includes a control data path and a voice data path.

7. The wireless communication system according to claim 1, wherein:
   each of the wireless relay and the mobile terminal includes a switch unit configured to select at least one of the short-range wireless link and the wired-connection link over which to exchange the control data and the voice data corresponding to the voice communication.

8. The wireless communication system according to claim 1, wherein the wireless relay or the mobile terminal is further configured to:
   when the insertion event is received, switch from the short-range wireless link to the wired-connection link to continue exchanging the control data and the voice data corresponding to the voice communication; and
   when the removal event is received, switch from the wired-connection link to the short-range wireless link to continue exchanging the control data and the voice data corresponding to the voice communication.

9. The wireless communication system according to claim 1, wherein:
the mobile terminal uses standard modem commands to exchange the control data corresponding to the voice communication with the wireless relay when operating in the transparent mode.

10. The wireless communication system according to claim 1, wherein:
the mobile terminal uses abstract telephony protocol (ATP) commands to exchange the control data corresponding to the voice communication with the wireless relay when operating in the translation mode, and the wireless relay translates the ATP commands into the standard modem commands.

11. A wireless communication system, comprising:
a wireless relay coupled to a phone network; and
a mobile terminal physically coupled to the wireless relay to make a voice communication with the phone network via the wireless relay,
wherein the mobile terminal and the wireless relay exchange control data and voice data corresponding to the voice communication over a short-range wireless link based on one of a transparent mode and a translation mode, and
a signaling connection is established on an asynchronous connection-oriented logical (ACL) transport channel between the mobile terminal and the wireless relay for exchanging the control data, and a voice connection is established on a synchronous connection oriented (SCO) channel between the mobile terminal and the wireless relay for exchanging the voice data, and
the mobile terminal is connected to the wireless relay through a charging interface,
wherein the wireless relay is further configured to:
when a current power level of the wireless relay and a current power level of the mobile terminal are both above corresponding low thresholds, disallow charging for both the wireless relay and the mobile terminal; and
when the current power level of the wireless relay and the current power level of the mobile terminal are both below corresponding high thresholds, disallow charging for both the wireless relay and the mobile terminal.

12. The wireless communication system according to claim 11, wherein the wireless relay is further configured to:
when the current power level of the wireless relay is higher than the corresponding high threshold and the current power level of the mobile terminal is lower than the corresponding low threshold, charge the mobile terminal from the wireless relay; and
when the current power level of the wireless relay is lower than the corresponding low threshold and the current power level of the mobile terminal is higher than the corresponding high threshold, charge the wireless relay from the mobile terminal.

13. A wireless communication system, comprising:
a wireless relay coupled to a phone network; and
a mobile terminal physically coupled to the wireless relay to make a voice communication with the phone network via the wireless relay,
wherein the mobile terminal and the wireless relay exchange control data and voice data corresponding to the voice communication over a short-range wireless link based on one of a transparent mode and a translation mode, and
a signaling connection is established on an asynchronous connection-oriented logical (ACL) transport channel between the mobile terminal and the wireless relay for exchanging the control data, and a voice connection is established on a synchronous connection oriented (SCO) channel between the mobile terminal and the wireless relay for exchanging the voice data, and
the mobile terminal is connected to the wireless relay through a charging interface,
wherein the wireless relay is further configured to:
when a current power level of the wireless relay and a current power level of the mobile terminal are both above respective single thresholds, disallow charging for both the wireless relay and the mobile terminal; and
when the current power level of the wireless relay and the current power level of the mobile terminal are both below the respective single thresholds, disallow charging for both the wireless relay and the mobile terminal.

14. The wireless communication system according to claim 13, wherein the wireless relay is further configured to:
when the current power level of the wireless relay is higher than the corresponding single threshold and the current power level of the mobile terminal is lower than the corresponding single threshold, charge the mobile terminal from the wireless relay; and
when the current power level of the wireless relay is lower than the corresponding single threshold and the current power level of the mobile terminal is higher than the corresponding single threshold, charge the wireless relay from the mobile terminal.

15. A wireless relay, comprising:
a phone module configured to couple the wireless relay with a phone network; and
a wireless module coupled to the phone module and configured to wirelessly connect to a mobile terminal such that the mobile terminal makes a voice communication with the phone network via the wireless relay, wherein the mobile terminal and the wireless relay exchange control data and voice data corresponding to the voice communication over a short-range wireless link based on one of a transparent mode and a translation mode, and
wherein the wireless relay is configured as a casing for the mobile terminal and to be physically coupled to the mobile terminal through a connector interface including at least a charging interface;
the connector interface further includes a data interface to provide a wired-connection link between the wireless relay and the mobile terminal;
the data interface includes a control data path and a voice data path;
the connector interface further includes an insertion detection unit configured to generate an insertion event when the mobile terminal is inserted into the wireless relay and a removal event when the mobile terminal is removed from the wireless relay; and
wherein the wireless relay is further configured to:
determine a current connection status;
when the current connection status is the short-range wireless link, wait for the insertion event from the insertion detection unit; and
when the current connection status is the wired-connection link, wait for the removal event from the insertion detection unit.

16. The wireless relay according to claim 15, further including:
a switch unit configured to select at least one of the short-range wireless link and the wired-connection link over which to exchange the control data and the voice data corresponding to the voice communication.

17. The wireless relay according to claim 15, wherein the wireless relay is further configured to:
when the insertion event is received, switch from the short-range wireless link to the wired-connection link to continue exchanging the control data and the voice data corresponding to the voice communication; and
when the removal event is received, switch from the wired-connection link to the short-range wireless link to continue exchanging the control data and the voice data corresponding to the voice communication.

18. The wireless relay according to claim 15, wherein the wireless relay further includes an external power plug and is configured to:
determine charging conditions; and
when the external power plug is plugged into a power interface, charge the wireless relay and the mobile terminal through the charging interface.

19. The wireless relay according to claim 15, wherein the wireless relay is further configured to:
when a current power level of the wireless relay and a current power level of the mobile terminal are both above corresponding low thresholds, disallow charging for both the wireless relay and the mobile terminal; and
when the current power level of the wireless relay and the current power level of the mobile terminal are both below corresponding high thresholds, disallow charging for both the wireless relay and the mobile terminal.

20. The wireless relay according to claim 15, wherein the wireless relay is further configured to:
when a current power level of the wireless relay and a current power level of the mobile terminal are both above respective single thresholds, disallow charging for both the wireless relay and the mobile terminal; and
when the current power level of the wireless relay and the current power level of the mobile terminal are both below the respective single thresholds, disallow charging for both the wireless relay and the mobile terminal.

21. The wireless relay according to claim 19, wherein the wireless relay is further configured to:
when the current power level of the wireless relay is higher than the corresponding high threshold and the current power level of the mobile terminal is lower than the corresponding low threshold, charge the mobile terminal from the wireless relay; and
when the current power level of the wireless relay is lower than the corresponding low threshold and the current power level of the mobile terminal is higher than the corresponding high threshold, charge the wireless relay from the mobile terminal.

22. The wireless relay according to claim 20, wherein the wireless relay is further configured to:
when the current power level of the wireless relay is higher than the corresponding single threshold and the current power level of the mobile terminal is lower than the corresponding single threshold, charge the mobile terminal from the wireless relay; and
when the current power level of the wireless relay is lower than the corresponding single threshold and the current power level of the mobile terminal is higher than the corresponding single threshold, charge the wireless relay from the mobile terminal.

23. The wireless relay according to claim 15, wherein the wireless relay is further configured to: use one or more pre-configured driver software modules to couple the short-range wireless link and the wired-connection link to an operating system of the wireless relay such that control software modules of the wireless relay become exchangeable parts of the operating system.

* * * * *